US012242209B2

(12) United States Patent
Mukai et al.

(10) Patent No.: US 12,242,209 B2
(45) Date of Patent: Mar. 4, 2025

(54) IMAGE FORMING APPARATUS

(71) Applicant: CANON KABUSHIKI KAISHA, Tokyo (JP)

(72) Inventors: Takashi Mukai, Kanagawa (JP); Shuhei Kawasaki, Shizuoka (JP); Hideo Kihara, Kanagawa (JP); Nobuo Oshima, Tokyo (JP); Takahiro Kawamoto, Kanagawa (JP); Takayuki Kanazawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/401,801

(22) Filed: Jan. 2, 2024

(65) Prior Publication Data

US 2024/0231256 A1 Jul. 11, 2024

(30) Foreign Application Priority Data

Jan. 11, 2023 (JP) ................................ 2023-002750

(51) Int. Cl.
*G03G 15/08* (2006.01)

(52) U.S. Cl.
CPC ................................ *G03G 15/0812* (2013.01)

(58) Field of Classification Search
CPC ............. G03G 15/0812; G03G 15/065; G03G 15/0266; G03G 15/0808
See application file for complete search history.

(56) References Cited

U.S. PATENT DOCUMENTS

2014/0147139 A1* 5/2014 Hasegawa .......... G03G 15/0266 399/50
2019/0011860 A1* 1/2019 Tomine ................ G03G 21/169
2019/0094740 A1* 3/2019 Tanaka ............... G03G 15/0225

FOREIGN PATENT DOCUMENTS

JP 2003-307991 A 10/2003
JP 2005-352388 A 12/2005
JP 2010-032832 A 2/2010
JP 2022-175796 A 11/2022

* cited by examiner

*Primary Examiner* — Jessica L Eley
(74) *Attorney, Agent, or Firm* — VENABLE LLP

(57) ABSTRACT

An image forming apparatus includes an image bearing member, a charging member, an exposure unit, a developing unit including a developer carrying member and a regulating member, a transfer member, a counting portion, a driving portion, and a controller. The controller carries out control so as to perform an image forming operation capable of forming a developer image, on the image bearing member, to be transferred onto a recording material and a non-image forming operation in which the developer image to be transferred onto the recording material is not formed on the image bearing member. Depending on each of count values in a plurality of regions acquired by the counting portion in a predetermined period, the controller controls the driving portion so as to change a rotation amount of the developer carrying member in a developing rotation operation for rotating the developer carrying member during the non-image forming operation.

16 Claims, 8 Drawing Sheets

IMAGE FORMING APPARATUS

FIELD OF THE INVENTION AND RELATED ART

The present invention relates to an image forming apparatus, such as a copying machine, a printer, a facsimile machine, or a multi-function machine having a plurality of functions of these machines, using an electrophotographic type or an electrostatic recording type.

Conventionally, for example, in the image forming apparatus using the electrophotographic type, a surface of an image bearing member is electrically charged uniformly by a charging means, and the charged surface of the image bearing member is exposed to light by an exposure means on the basis of an image signal, so that an electrostatic latent image is formed on the image bearing member. Then, the electrostatic latent image formed on the image bearing member is developed by being supplied with a developer by a developing means, whereby a developer image is formed on the image bearing member.

As a developing means for developing the electrostatic latent image on the image bearing member, a developing device including a rotatable developer carrying member for conveying the developer to an opposing portion to the image bearing member while carrying the developer and a regulating member for regulating a developer amount of a developer layer on the developer carrying member has been known. In order to output a stable image by using such a developing device, it is required to acquire a layer thickness of a stable developer layer and a charge amount of the developer by charging the developer while forming a uniform developer layer on the developer carrying member by the regulating member. However, by long-term use of the developing device or the like, the developer is fixed or fused on the regulating member in some cases. When the developer is fixed or fused on the regulating member, a fixed material or a fused material thereof blocks a flow of the developer, so that it becomes difficult to acquire a stable layer thickness of the developer layer. As a result, a poor image density or a vertical stripe of the image occurs in some instances. Incidentally, the vertical stripe is stripe-shaped density non-uniformity extending in a rotational direction (surface movement direction) of the image bearing member, i.e., a rotational direction (surface movement direction) of the developer carrying member.

In Japanese Laid-Open Patent Application No. 2003-307991, a constitution in which a potential difference such that a potential of the regulating member is larger than a potential of the developer carrying member on a side identical in polarity to a normal charge polarity of the developer is formed between the regulating member and the developer carrying member (hereinafter, this potential difference is also referred to as a "blade bias") is disclosed. By forming such a potential difference, not only charging of the developer is appropriately made, but also fixing and fusion of the developer onto the regulating member are suppressed, so that it is possible to suppress the poor image density and the vertical stripe.

However, in the conventional image forming apparatus, for example, in the case where a vertical band image with a high print ratio is formed in a large amount, there is a problem such that fixing of a substance derived from the developer onto the regulating member is liable to occur. When the substance derived from the developer is fixed on the regulating member, the fixed substance blocks a flow of the developer, so that it becomes difficult to acquire a stable layer thickness of the developer layer. As a result, in some cases, the poor image density and the vertical stripe occur.

SUMMARY OF THE INVENTION

A principal object of the present invention is to suppress image inconveniences due to the regulating member.

This object has been accomplished by an image forming apparatus according to the present invention.

According to an aspect of the present invention, there is provided an image forming apparatus comprising: a rotatable image bearing member; a charging member configured to electrically charge a surface of the image bearing member; an exposure unit configured to expose a charged surface of the image bearing member to form an image portion on the image bearing member by an electrostatic latent image; a developing unit including a rotatable developer carrying member configured to form a developer image on the image bearing member by supplying a developer to the image portion of the image bearing member and including a regulating member configured to regulate the developer carried on the developer carrying member; a transfer member configured to transfer the developer image, formed on the image bearing member, onto a recording material; a counting portion configured to acquire a count value obtained by integrating a value correlating with an area of the image portion with respect to a direction along a surface movement direction of the developer carrying member for each of a plurality of regions obtained by dividing a surface region of the image bearing member with respect to a direction substantially perpendicular to the surface movement direction of the developer carrying member; a driving portion configured to drive the developer carrying member; and a controller capable of controlling the driving portion, wherein the controller carries out control so as to perform an image forming operation capable of forming the developer image, on the image bearing member, to be transferred onto the recording material and a non-image forming operation in which the developer image to be transferred onto the recording material is not formed on the image bearing member, and wherein depending on each of count values in the plurality of regions acquired by the counting portion in a predetermined period, the controller controls the driving portion so as to change a rotation amount of the developer carrying member in a developing rotation operation for rotating the developer carrying member during the non-image forming operation.

Further features of the present invention will become apparent from the following description of exemplary embodiments with reference to the attached drawings.

Figure 3:
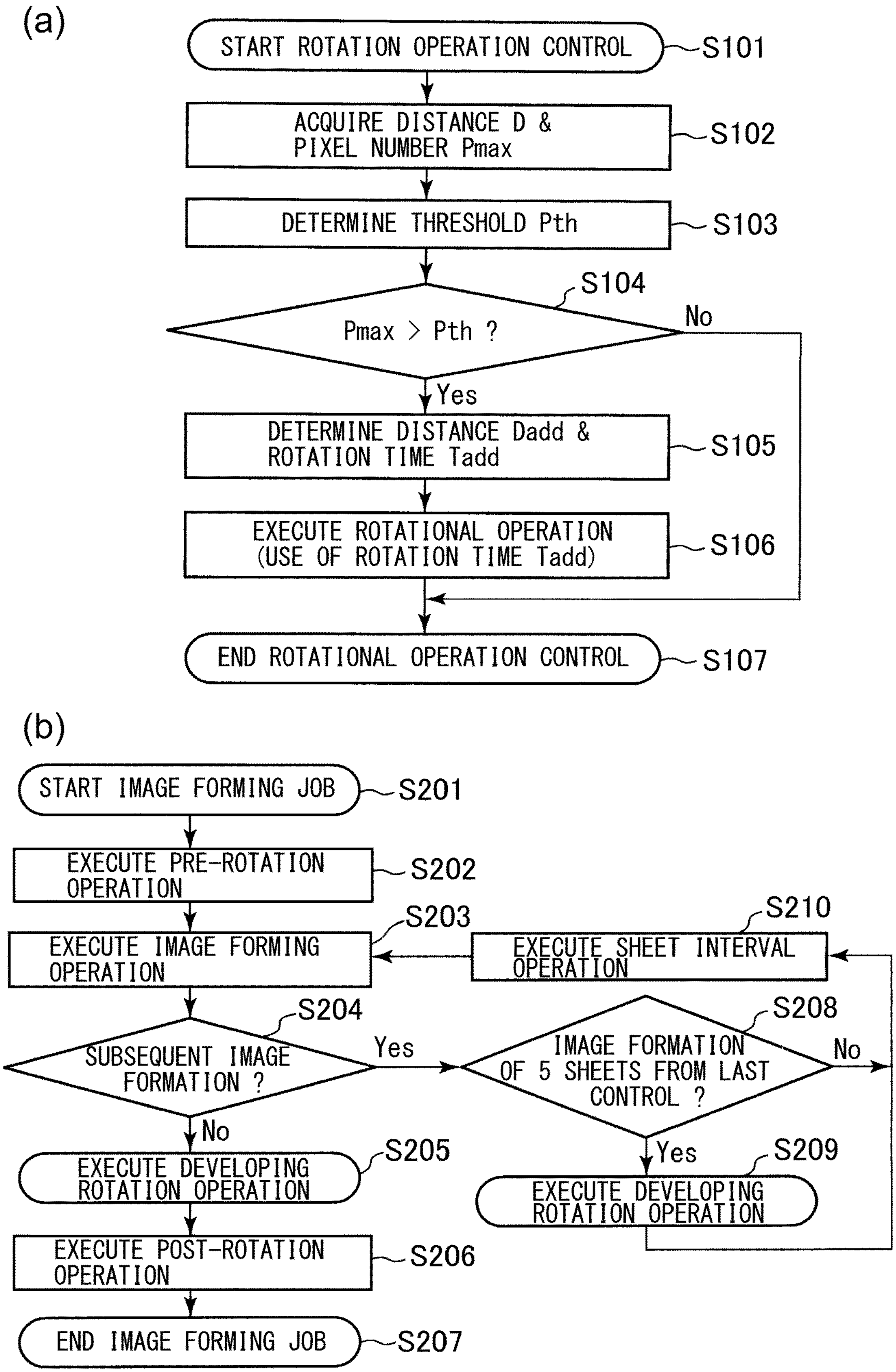

Part (a) of FIG. 3 is a flowchart of control of a developing rotation operation, and part (b) of FIG. 3 is a flowchart of control of an image forming job.

Figure 4:
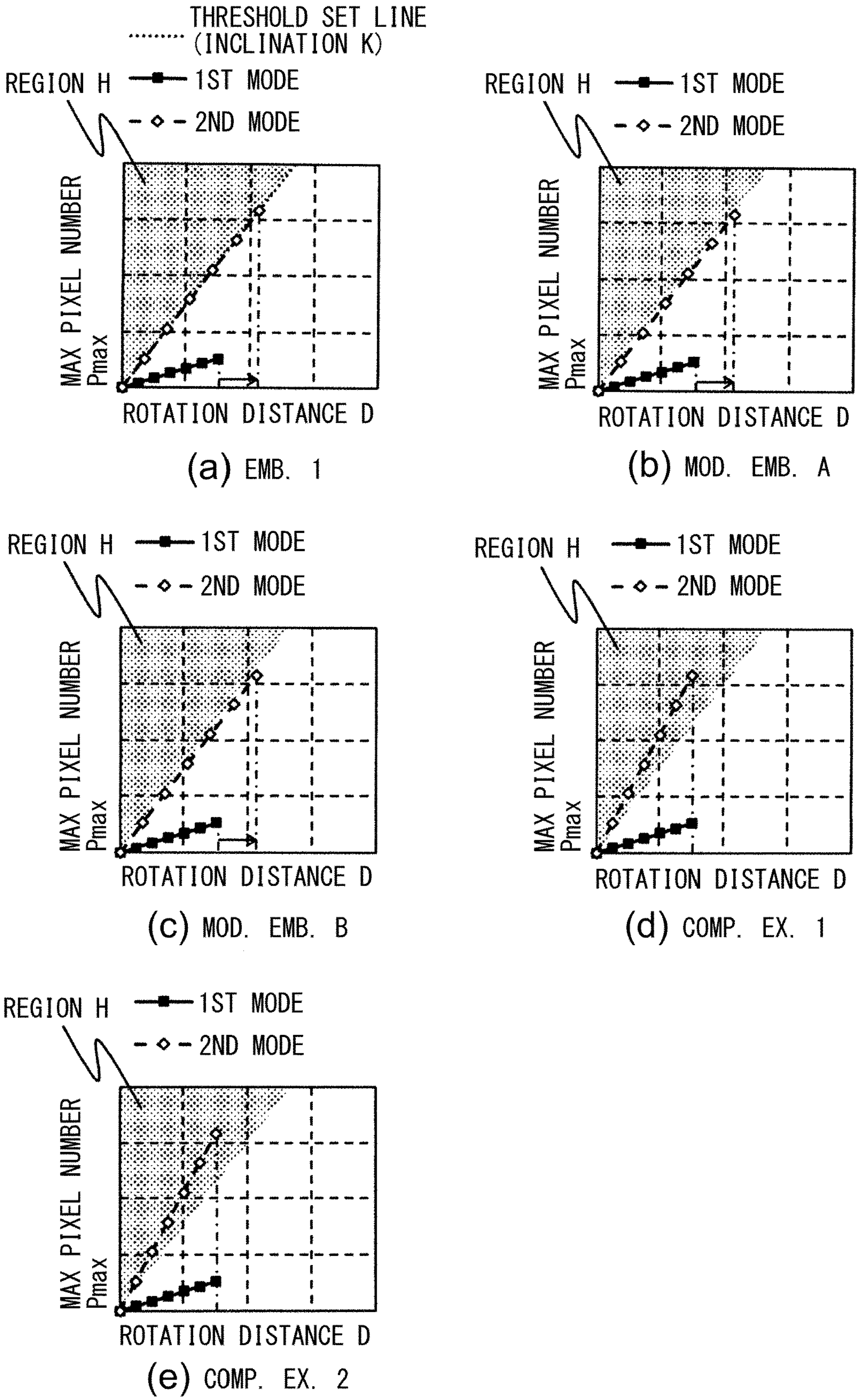

Parts (a) to (e) of FIG. 4 are graphs each for illustrating a control result of operations in first and second modes.

Figure 5:
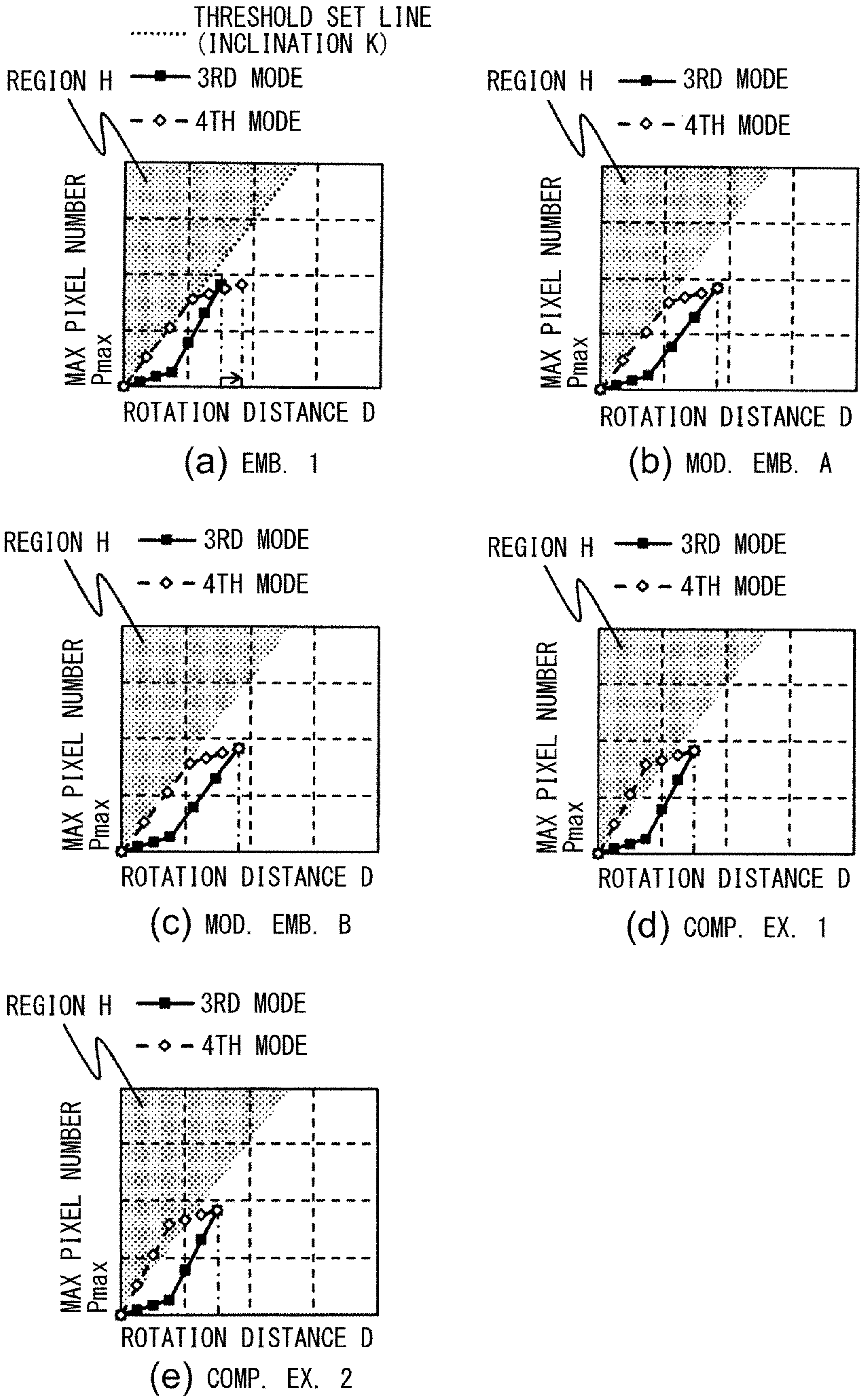

Parts (a) to (e) of FIG. 5 are graphs each for illustrating a control result of operations in third and fourth modes.

Figure 6:
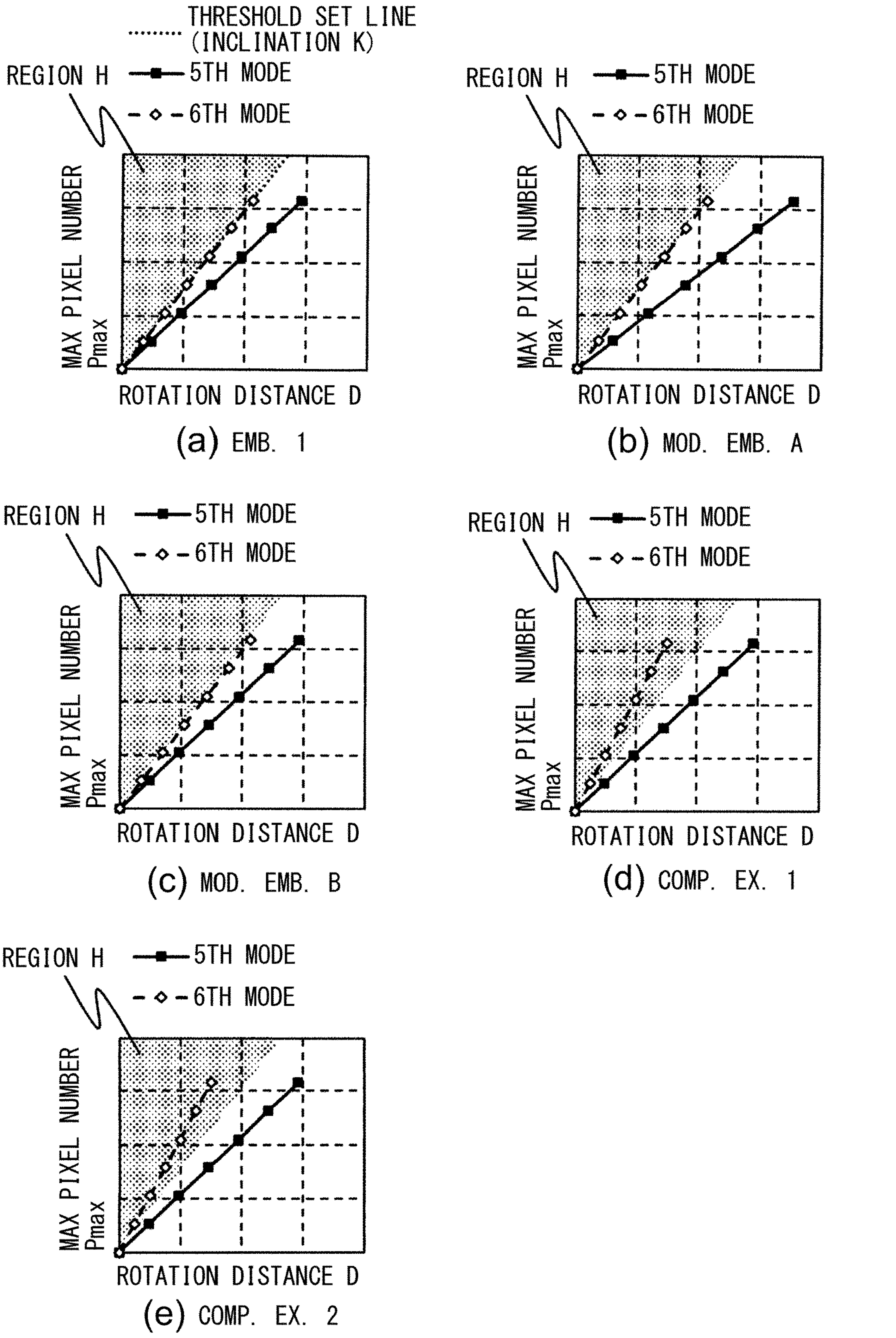

Parts (a) to (e) of FIG. 6 are graphs each for illustrating a control result of operations in fifth and sixth modes.

Figure 7:
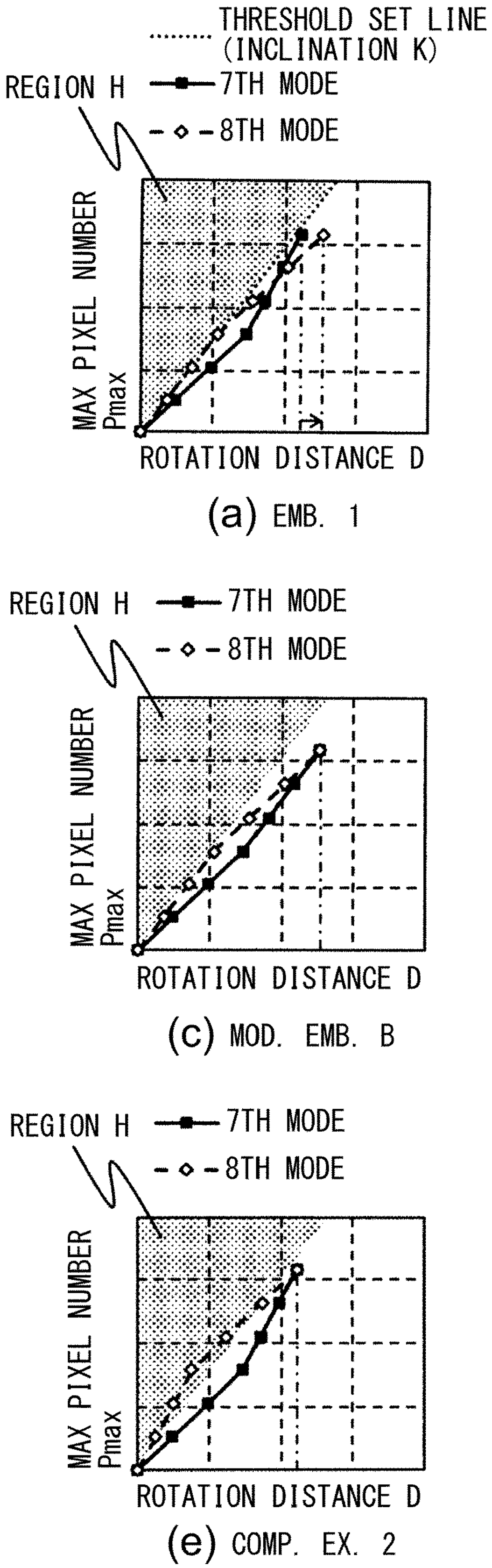

Parts (a) to (e) of FIG. 7 are graphs each for illustrating a control result of operations in seventh and eighth modes.

Figure 8:
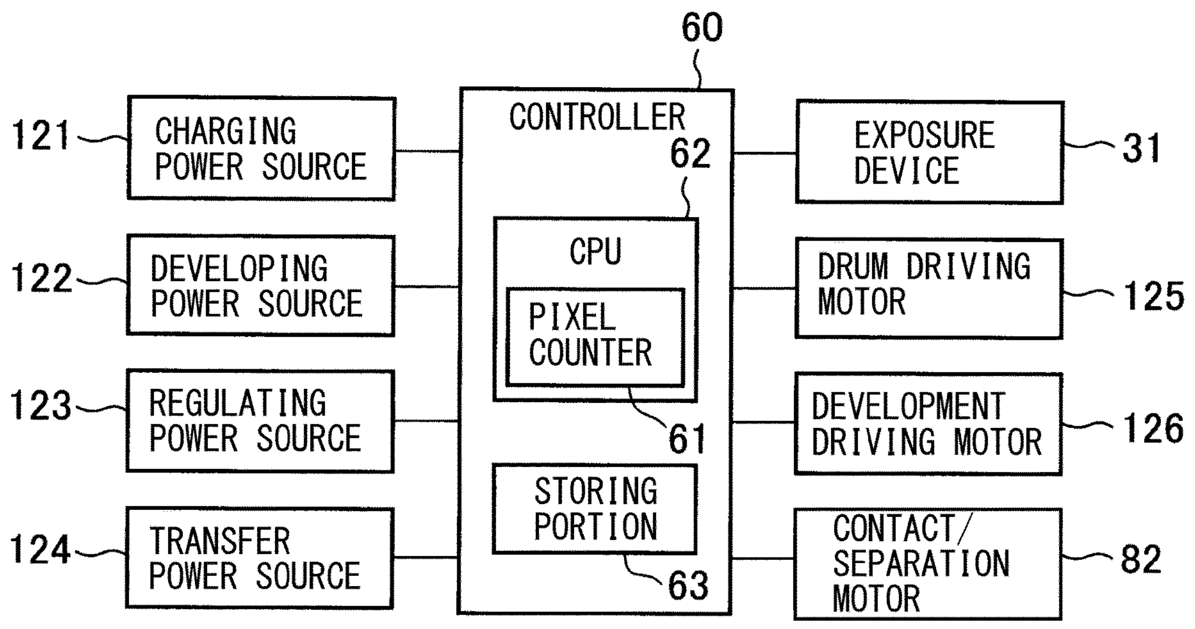

FIG. 8 is a block diagram showing an outline of a control constitution of the image forming apparatus.

DESCRIPTION OF THE EMBODIMENTS

In the following, embodiments of an image forming apparatus according to the present invention will be described specifically with reference to the drawings. However, dimensions, materials, shapes, a relative arrangement, and the like of constituent parts described in the following embodiments should be appropriately changed depending on constitutions and various conditions of apparatuses (devices) to which the present invention is applied, and a scope of the present invention is not limited to the following embodiments.

<General Structure and Image Forming Operation of Image Forming Apparatus>

Figure 1:
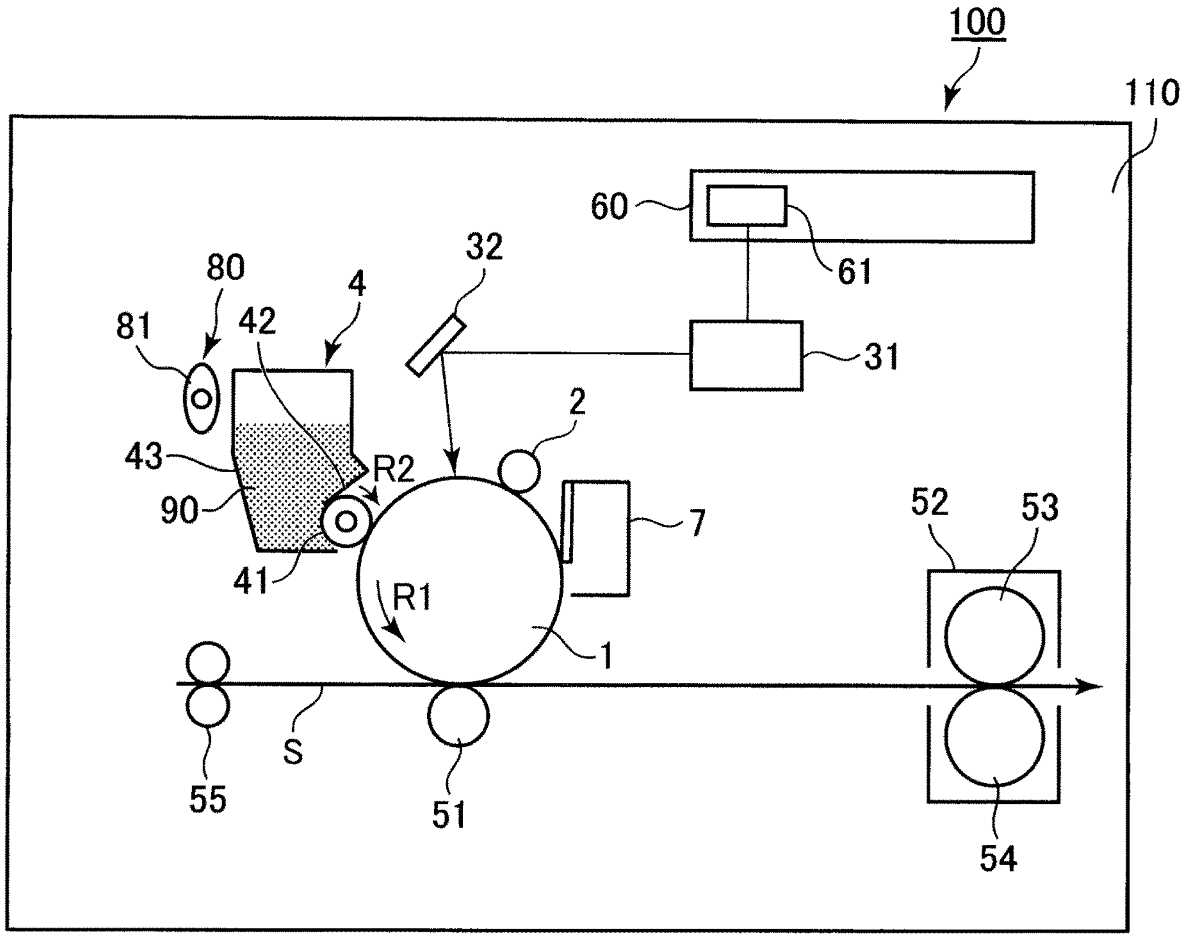
FIG. 1 is a schematic sectional view showing a general structure of an image forming apparatus.

First, with reference to FIG. 1, a general structure and an image forming operation of an image forming apparatus 100 of this embodiment will be described with reference to FIG. 1. FIG. 1 is a schematic sectional view showing the general structure (schematic structure) of the image forming apparatus 100 of this embodiment. The image forming apparatus 100 of this embodiment is a monochromatic laser beam printer capable of forming a black (monochromatic) image on a sheet-like recording material S on the basis of an image signal (image information) inputted from an external device such as a host computer, by utilizing an electrophotographic type.

The image forming apparatus 100 includes a photosensitive drum 1 which is a rotatable drum-type (cylindrical) photosensitive member (electrophotographic photosensitive member) as an image bearing member. The photosensitive drum 1 is rotationally driven about a rotation shaft thereof in an arrow R1 direction (counterclockwise direction) in FIG. 1 by a drum driving motor 125 (FIG. 8) as an image bearing member driving portion constituting a driving means. In this embodiment, the photosensitive drum 1 is rotationally driven so that a moving speed (peripheral speed) of an outer peripheral surface thereof becomes 100 mm/sec.

The surface of the photosensitive drum 1 is electrically charged uniformly to a predetermined potential of a predetermined polarity (negative polarity in this embodiment) by a charging roller (charging device) 2 which is a roller-shaped charging member as a charging means. In this embodiment, the charging roller 2 is an electroconductive roller provided with an electroconductive elastic layer on a core metal and is disposed in contact with the surface of the photosensitive drum 1 by a predetermined pressure, and is rotated with rotation of the photosensitive drum 1. During image formation (during charging), to the charging roller 2, a predetermined charging (charging voltage) is applied by a charging power source 121 (FIG. 8) as a charging voltage applying means (charging voltage applying portion). By this, electrical discharge occurs between the charging roller 2 and the photosensitive drum 1, so that the surface of the photosensitive drum 1 is electrically charged to a predetermined charging potential (dark-portion potential) Vd1. In this embodiment, during the image formation (during the charging), to the charging roller 2, a DC voltage of −1100 V is applied as the charging bias, and the charging potential (dark-portion potential) Vd1 of the photosensitive drum 1 after the charging is set to −600 V.

The charged surface of the photosensitive drum 1 is subjected to scanning exposure to laser light modulated on the basis of an image signal by an exposure device (laser scanner) 31 as an exposure means, so that an electrostatic latent image (electrostatic image) is formed on the photosensitive drum 1. A laser beam emitted from the exposure device 31 is irradiated on the surface of the photosensitive drum 1 via a reflection mirror 32. A main scan direction is substantially parallel to a rotational axis direction (direction substantially perpendicular to a surface movement direction) of the photosensitive drum 1. The electrostatic latent image formed on the photosensitive drum 1 includes a print portion (image portion) and a background portion (non-image portion) which is a portion inverted to the print portion. In this embodiment, the exposure device 31 is constituted so that the background portion on the photosensitive drum 1 is capable of being exposed to the laser light in a first exposure amount (background exposure) and so that the print portion on the photosensitive drum 1 is capable of being exposed to the laser light in a second exposure amount larger than the first exposure amount. The surface potential of the photosensitive drum 1 corresponding to the background portion is attenuated to a non-image portion potential Vd2 by the first exposure amount, and the surface print of the photosensitive drum 1 corresponding to the print portion is attenuated to an image-portion potential V1 by the second exposure amount. By this, the electrostatic latent image is formed on the photosensitive drum 1. In this embodiment, the non-image portion potential Vd2 of the background portion after the background exposure is set to −550 V, and the image portion potential V1 of the print portion after the exposure is set to −100 V. Incidentally, the exposure device 31 is not limited to the constitution as in this embodiment, but a constitution in which the exposure to light is performed only for the print portion without subjecting the background portion to the background exposure may be employed.

The electrostatic latent image formed on the photosensitive drum 1 is developed (visualized) by being supplied with toner 90 as a developer by a developing device 4 as a developing means, so that a toner image (developer image) is formed on the photosensitive drum 1. In this embodiment, the developing device 4 is a developing device employing a contact development type and a reverse development type in which the toner 90 which is a one-component developer of which normal charge polarity (a principal charge polarity of the developer when the electrostatic latent image is developed with the developer) is the negative polarity. The developing device 4 includes a developing roller 41 as a developer carrying member (developing member), a regulating blade 42 as a regulating member, and a developing container 43 for accommodating the toner 90. The developing roller 41 is constituted by providing an elastic layer formed with an elastic rubber or the like on the photosensitive drum 1 and has an outer peripheral surface having a cylindrical shape of 10 mm in outer diameter. The developing roller 41 is rotatably supported by the developing container 43 at opposite end portions thereof with respect to a rotational axis direction thereof. The rotational axis direction of the developing roller 41 is substantially parallel to a rotational axis direction of the photosensitive drum 1 (main scan direction of the exposure device 31). During the image formation (during a developing operation), the developing roller 41 contacts the photosensitive drum 1 and is rotationally driven in an arrow R2 direction (clockwise direction) in FIG. 1 by a development driving motor 126 (FIG. 8) as a driving portion constituting the driving means. In this embodiment, in order to obtain an appropriate image density, the developing roller 41 is rotationally driven so that a moving speed (peripheral speed) of the outer peripheral surface thereof becomes 140 mm/see which is 140% to a moving speed (peripheral speed) of the outer peripheral surface of the photosensitive drum 1. The regulating blade 42 is constituted by a flexible metal plate and has a predetermined length with respect to each of a longitudinal direction substantially parallel to the rotational axis direction of the developing roller 41 and a short(-side) direction substantially perpendicular to the longitudinal direction. The regulating blade 42 is fixed to the developing container 43 at one end portion thereof with respect to the short direction and has a free end at the other end portion. Further, the regulating blade 42 is disposed so that a surface in the neighborhood of the free end contacts the developing roller 41. The toner 90 accommodated in the developing container 43 is supplied onto the developing roller 41 and is held (carried) on the developing roller 41 in a state in which the toner 90 is formed in a thin layer by the regulating blade 42 with rotation of the developing roller 41. When the toner of the toner layer on the developing roller 41 passes through a contact portion between the developing roller 41 and the regulating blade 42, an amount of the toner 90 is regulated by the regulating blade 42, and electric charges are imparted to the toner 90 by the regulating blade 42 through triboelectric charge or the like.

During the image formation (during the developing operation), to the developing roller 41, a predetermined developing bias (developing voltage) Vdev is applied by a developing power source 122 (FIG. 8) as a developing voltage applying means (developing voltage applying portion). In this embodiment, during the image formation (during the developing operation), to the developing roller 41, a DC voltage of −350 V is applied as the developing bias Vdev. The toner 90 is transferred onto the surface of the photosensitive drum 1 corresponding to the print portion. At this time, an electrostatic force acts on the toner 90 in a direction toward the photosensitive drum 1 by a potential difference between the image-portion potential V1 (−100 V) on the photosensitive drum 1 and the developing bias Vdev (−350 V) (V1-Vdev=250 V). On the other hand, almost all of the toner 90 is not transferred onto the surface of the photosensitive drum 1 corresponding to the background portion. At this time, an electrostatic force acts on the toner 90 in a direction toward the developing roller 41 by a potential difference between the non-image portion potential Vd2 (−550 V) and the developing bias Vdev (−350 V) (Vd2-Vdev=−200 V). That is, between the print portion and the background portion, a potential between the surface print of the photosensitive drum 1 and the developing bias Vdev is opposite to each other. Thus, the toner image corresponding to the image signal is formed on the photosensitive drum 1.

Further, during the image formation (during the developing operation), in addition to the application of the developing bias Vdev to the developing roller 41, to the regulating blade 42, a predetermined regulating bias (developing voltage) V1d is applied by a regulating power source 123 (FIG. 8) as a regulating voltage applying means (regulating voltage applying portion). In order to suppress the fixing and the fusion of the toner 90 to the regulating blade 42 and to satisfactorily perform the charging of the toner 90, a blade bias A (=Vb1-d-Vdev) which is a potential difference between the regulating bias Vb1-d and the developing bias Vdev may preferably have the same polarity as the normal charge polarity of the toner 90. That is, as the blade bias A, between the regulating blade 42 and the developing roller 41, a potential difference such that the potential (developing bias Vb1-d) of the regulating blade 42 is larger than the potential (developing bias Vdev) on the same polarity side as the normal charge polarity of the toner 90. In this embodiment, during the image formation (during the developing operation), to the regulating blade 42, a DC voltage of −450 V is applied as the regulating bias Vb1-d so that the blade bias A becomes −100 V of the negative polarity.

Further, in this embodiment, the image forming apparatus 100 is provided with a contact and separation mechanism 80 as a contact and separation means capable of separating the developing roller 41 from the photosensitive drum 1 during non-image formation by switching a contact and separation state between the photosensitive drum 1 and the developing roller 41. In this embodiment, the contact and separation mechanism 80 is constituted by including a cam 81 as a contact and separation member provided outside the developing device 4 and a contact and separation motor 82 (FIG. 8) as a contact and separation driving portion constituting the driving means for rotating the cam 81. The contact and separation mechanism 80 controls a contact and separation state between the photosensitive drum 1 and the developing roller 41 by moving the developing device 4 through rotation of the cam 81. The developing roller 41 rotates in a state in which the developing roller 41 contacts the surface of the photosensitive drum 1 during the image formation (during the developing operation) (hereinafter, this state is also referred to as a “development contact state” 7). The developing roller 41 rotates in a state in which the developing roller 41 separates from the surface of the photosensitive drum 1 during the non-image formation (hereinafter, this state is also referred to as a “development separation state”). However, in this embodiment, even during the non-image formation, the developing roller 41 is put in the development contact state in a period between continuous image forming operations (sheet interval period) and a period of a developing rotation operation described later. Further, in this embodiment, when the developing roller 41 is put in the development separation state during the non-image formation, rotation of the developing roller 41 is stopped.

To the toner 90, in order to improve flowability and chargeability of the toner 90, a coating material (external additive, auxiliary particles) containing an inorganic compound is externally added. As the coating material, for example, it is possible to cite inorganic oxide fine particles such as silica fine particles, alumina fine particles, and titanium oxide fine particles; inorganic stearic acid compound fine particles such as aluminum stearate fine particles and zinc stearate fine particles; inorganic titanic acid compound fine particles such as strontium titanate fine particles and zinc titanate fine particles; or hydrotalcite compound fine particles; or the like. These materials can be used singly or in mixture of two or more species. In order to suppress a lowering in fixing property of the toner 90 onto the recording material S and contamination of the photosensitive drum 1 with the coating material while improving the flowability and the chargeability of the toner 90 by the coating material, an amount of the above-described various coating materials may preferably be the following amount in total per 100 wt. parts of the toner particles. That is, the total amount of the coating material(s) may preferably be 0.05 wt. part or more and 5.00 wt. parts or less, more preferably be 0.10 wt. part or more and 3.00 wt. parts or less. In this embodiment, the hydrotalcite fine particles which are a substance having a charge polarity (positive polarity) opposite to the normal charge polarity of the toner 90 are used.

A transfer roller 51 which is a roller-type transfer member as a transfer means is disposed opposed to the photosensitive drum 1. The transfer roller 51 is pressed toward the photosensitive drum 1 and forms a transfer portion which is a contact portion between the photosensitive drum 1 and the transfer roller 51. As described above, the toner image formed on the photosensitive drum 1 is electrostatically transferred onto the recording material (recording medium, transfer material, sheet) S such as a recording sheet or a plastic sheet as a toner image receiving member nipped and conveyed by the photosensitive drum 1 and the transfer roller 51. During the image formation (during transfer), to the transfer roller 51, a predetermined transfer bias (transfer voltage) which is a DC voltage of the opposite polarity to the normal charge polarity of the toner 90 is applied by a transfer power source 124 (FIG. 8) as a transfer voltage applying means (transfer voltage applying portion). The recording material S is fed from a feeding portion (not shown) provided with a cassette as a recording material accommodating portion, a feeding roller as a feeding member, and the like, and then is conveyed to a transfer portion by being time d to the toner image, by a conveying roller pair (registration roller pair) 55 as a feeding member.

The recording material S on which the toner image is transferred is conveyed to a fixing device 52 as a fixing means. The fixing device 52 includes a heating roller 53 provided with a heat source and includes a pressing roller 54 press-contacting the heating roller 53. The fixing device 52 fixes (melts, sticks) the toner image on the recording material S by pressing and heating the toner image in a process in which the recording material S on which the (unfixed) toner image is carried is nipped and conveyed by the heating roller 53 and the pressing roller 54. The recording material S on which the toner image is fixed is discharged (outputted) as an image-formed product to an outside of an apparatus main assembly 110 of the image forming apparatus 100.

Further, the toner 90 (transfer residual toner) remaining on the photosensitive drum 1 after the transfer is removed and collected from the photosensitive drum 1 by a cleaning device 7 as a cleaning means.

Incidentally, each of the photosensitive drum 1, the developing roller 41, the transfer roller 51, the conveying roller 55, the cam 81 of the contact and separation mechanism 80, the pressing roller 54 of the fixing device 52, and the like is rotated by a driving force transmitted from an associated one of the various motors (power sources) provided in the apparatus main assembly 110. Further, in the apparatus main assembly 110, power sources for applying the voltages to the charging roller 2, the developing roller 41, the regulating blade 42, the transfer roller 51, and the like, respectively, are provided. In addition, in the apparatus main assembly 110, a controller 60 for controlling the respective portions of the image forming apparatus 100 is provided.

The photosensitive drum 1 and, as process means actable thereon, at least one of the charging roller 2, the developing device 4, and the cleaning device 7 may integrally constitute a process cartridge detachably mountable to the apparatus main assembly 110. Further, the developing device 4 may be formed, in addition to the form of the process cartridge detachably mountable to the apparatus main assembly 110, substantially singly as a cartridge (developing cartridge) detachably mountable to the apparatus main assembly 110. Further, a supply container accommodating the developer (toner) supplied to the developing device 4 is provided in the apparatus main assembly 110 or is detachably mountable, as the process cartridge or the developing cartridge, to the apparatus main assembly 110.

<Controller>

Next, the controller 60 of the image forming apparatus 100 in this embodiment will be described. FIG. 8 is a block diagram showing an outline of a control constitution of the image forming apparatus 100 in this embodiment.

The controller 60 is constituted by including a CPU 62 as a calculation processing means which is a central element for performing calculation (computation) processing, a storing portion 63, such as a ROM, a RAM, or a nonvolatile memory, as a storing means, and an input/output circuit (not shown) as an input/output means. In the ROM, a control program, a data table acquired in advance, and the like are stored. In the RAM, inputted information, detected information, a calculation result, and the like are stored. In the nonvolatile memory, information on use histories of the image forming apparatus 100 and the developing device 4 such as a maximum cumulative pixel number Pmax and a cumulative developing rotation distance D which are described later, and the like are stored. Incidentally, the storing portion (nonvolatile memory) for storing the maximum cumulative pixel number Pmax and the cumulative developing rotation distance D is provided on the developing device 4 (process cartridge or developing cartridge) and may be made together with the developing device 4 detachably mountable to the apparatus main assembly 110. The input/output circuit controls input and output of signals between the controller 60 and devices connected thereto. To the controller 60, for example, various power sources such as the charging power source 121, the developing power source 122, the regulating power source 123, the transfer power source 124, and the like, various motors such as the drum driving motor 125, the development driving motor 126, the contact and separation motor 82, and the like, the exposure device 31, and the like are connected.

The controller 60 receives image information and a print instruction sent from an external device such as a host computer and controls an image forming operation of the image forming apparatus 100. Further, the controller 60 controls rotational operations of the developing roller 41 and the photosensitive drum 1 during non-image formation described later (herein, this operation is also referred to as a "developing rotation operation").

The controller 60 includes a pixel number counting portion 61 as a print amount counting portion. In this embodiment, the pixel number counting portion 61 is realized by executing of the program stored in the storing portion 63, by the CPU 62. On the basis of the image signal sent to the exposure device 31, the pixel number counting portion 61 acquires pixel number count information correlating with an area of a print portion (image portion) on the photosensitive drum 1. Here, the pixel number counting portion 61 divides a region on the photosensitive drum 1 with respect to the rotational axis direction of the developing roller 41 (direction substantially perpendicular to a surface movement direction) (x-direction) into a plurality of regions A1 to An to which an associated region number n=1 to n is added, and then counts a pixel number for each region Ax of the divided plurality of regions A1 to An. Incidentally, n is a natural number of 2 or more.

Figure 2:
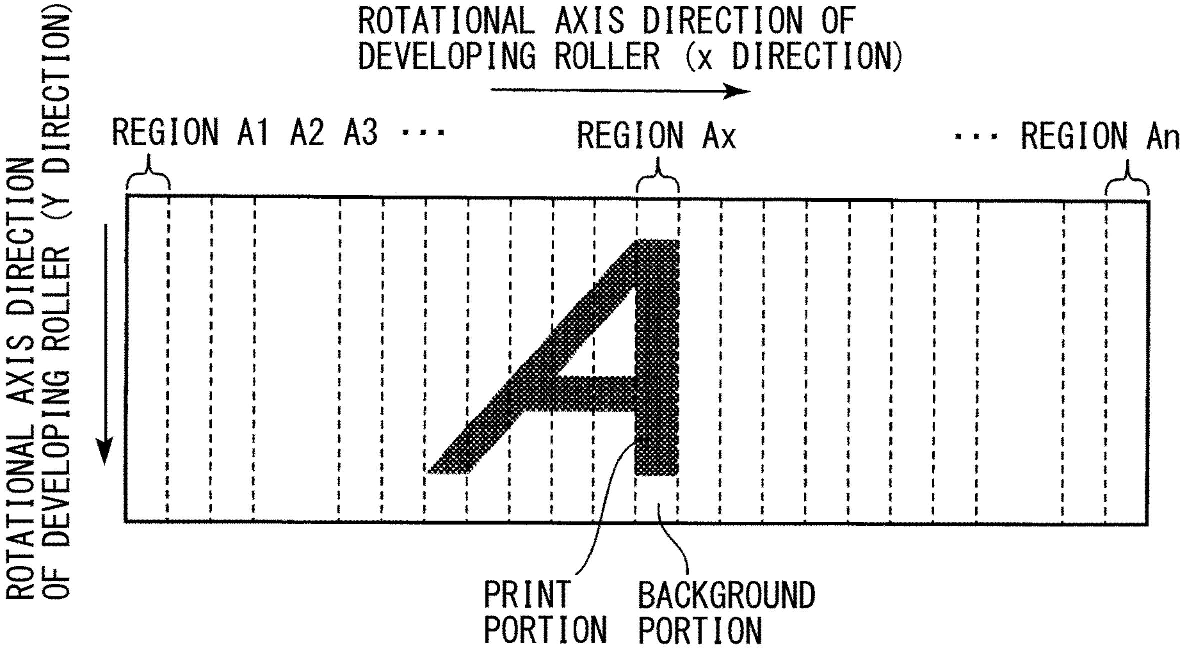
FIG. 2 is a schematic view showing a plurality of divided regions A1 to An on a photosensitive drum.

FIG. 2 is a schematic view which shows the divided plurality of regions A1 to An on the photosensitive drum 1 and in which the regions are developed on a plane of the photosensitive drum 1. The pixel number counting portion 61 measures the pixel number of the print portion in each region Ax with respect to the main scan direction, i.e., the rotational axis direction of the developing roller 41 (x-direction). Then, with rotation of the photosensitive drum 1, the pixel number counting portion 61 integrates the pixel number of the print portion in each region Ax with respect to the rotational direction (surface movement direction) of the photosensitive drum 1 which is a sub-scan direction. By this, the pixel number counting portion 61 counts the pixel number of the print portion in each region Ax for one image formation (formation of the image on a single recording material S). Thus, for each region Ax, the pixel number counting portion 61 counts the pixel number correlating with an area of the print portion on the photosensitive drum 1.

Incidentally, the number of times the image formation is counted in terms of a "number of sheets in some cases on the assumption that the formation of the image on the single recording material S is carried out by one (single) image formation. Accordingly, an "image formation sheet number" not only represents the number of sheets of the recording materials S on which the images are formed, but also represents the number of times of image formation for an associated number of sheets of the recording materials. Further, continuous formation of the images on a plurality of recording materials S is also referred to as "continuous image formation", and the number of sheets of the recording materials S on which the images are formed by the continuous image formation and the number of times of image formation in the continuous image formation are also referred to as "continuous image formation sheet number". Further, a series of operations which is performed by a single start instruction (print instruction) and in which an image is formed on a single recording material S or images are formed on a plurality of recording materials S and then the single recording material S or the plurality of recording materials S are outputted from the image forming apparatus 100 is referred to as an "image forming job".

Here, depending on a width of an image forming recording material S (length in a direction substantially perpendicular to the feeding direction), a width of an image forming region on the photosensitive drum 1 which is a region in which the toner image is capable of being formed in the rotational axis direction (x-direction) of the developing roller 41 also changes. In this embodiment, in order to more preferably acquire an effect of the present invention even in the case where an image with any width is formed, a width of each region Ax is set as follows. That is, in this embodiment, a region in which the toner 70 is capable of being supplied from the developing roller 41 to the photosensitive drum 1 in the rotational axis direction (x-direction) of the developing roller 41 (or a width of a maximum-width recording material S of recording materials S on which images are capable of being formed by the image forming apparatus 100) is divided equally in width. In this embodiment, the width of each region Ax is a width obtained by equally dividing a latter size-width which is 215.9 mm into 64 portions. By this, irrespective of the width of the recording material S on which the image is formed, the width of each region Ax becomes about 3.4 mm. Further, in the case where a solid black image with no margin is formed on a single recording material S with a later size, the number of pixels in each region Ax counted by the pixel number counting portion 61 is about 526 k pixels when one picture element in resolution of 600 dpi is one pixel.

The number of division of the plurality of regions A1 to An may also be the number of division other than 64 in this embodiment. Further, in this embodiment, each region Ax is a region obtained by dividing a region (image forming region) in which the image is formed on the developing roller 41 or the photosensitive drum 1, but may also include a region (non-image forming region) in which the image is not formed on the developing roller 41 or the photosensitive drum 1. Further, each region Ax is not required to have an equal width, but may also include at least one region different in width.

The pixel number counting portion 61 counts the pixel number of each region Ax for every image formation. Then, the controller 60 (CPU 62) acquires a cumulative pixel number Px of each region Ax obtained by integrating the pixel number of each region Ax counted by the pixel number counting portion 61 for all the image forming operations in a predetermined period, and then causes the storing portion 63 to store the cumulative pixel number Px. That is, the controller 60 acquires a cumulative pixel number P1 to a cumulative pixel number Pn as print amounts corresponding to the plurality of regions A1 to An, respectively, in the predetermined period. Further, the controller 60 calculates a maximum cumulative pixel number Pmax which is a maximum value of the cumulative pixel number P1 to the cumulative pixel number Pn in the regions A1 to An in the predetermined period, and causes the storing portion 63 to store the maximum cumulative pixel number Pmax. That is, the controller 60 acquires the maximum cumulative pixel number Pmax as a maximum print amount in the predetermined period.

In this embodiment, as the predetermined period, the cumulative developing rotation distance D which is a rotation distance of the developing roller 41 from an initial state of the toner 90 is used. In this embodiment, the cumulative developing rotation distance D is a rotation print in a development contact state and does not include a rotation distance in a development separation state. The controller 60 calculates the cumulative developing rotation distance D every time when the image formation or a development rotation operation during the non-image formation or the like is performed, and then causes the storing portion 63 to store (update) the cumulative developing rotation distance D. Here, the initial state of the toner 90 refers to a time of a new article of the developing device 4 including the toner 90 or immediately after new (fresh) toner 90 is supplied to the developing device 4 small in amount of the toner 90. That is, when the developing device 4 is exchanged to the new article or when the toner 90 is supplied to the developing device 4, the cumulative developing rotation distance D is reset to an initial value (0 in this embodiment).

Here, the rotation distance of the developing roller 41 can be calculated by multiplying a driving time of the developing device 4 (developing roller 41) by a rotational speed (peripheral speed) of the developing roller 41. Further, the rotational speed (peripheral speed) of the developing roller 41 can be calculated by multiplying, for example, a rotational speed of the photosensitive drum 1 by a ratio (peripheral speed ratio) of the rotational speed (peripheral speed) of the developing roller 41 to the rotational speed (peripheral speed) of the photosensitive drum 1. The rotational speed (peripheral speed) of the photosensitive drum 1 corresponds to the process speed of the image forming apparatus 100. The rotation distance of the developing roller 41 is a distance (surface movement distance) representing how long a point on the surface of the developing roller 41 moves in distance.

Incidentally, the predetermined period may also include the rotation distance in the development separation state. Further, the predetermined period is not limited to that the rotation distance of the developing roller 41 is set as an index. The predetermined period can be set by an arbitrary index correlating with a rotation amount (use amount, driving amount) of the developing roller 41. For example, the predetermined time can be set by using, as the index, the rotation distance, the number of turns (rotations), or a rotation time of the developing roller 41, the number of sheets of image-formed recording materials S (image formation sheet number), the rotation distance, the number of turns, or a rotation time of the photosensitive drum 1, or the like.

In this embodiment, on the basis of the acquired information on the maximum cumulative pixel number Pmax and the acquired information on the cumulative developing rotation distance D, the controller 60 carries out control so as to perform discrimination of execution of the developing rotation operation described later or to determine a rotation time or the like of the developing roller 41 in the developing rotation operation.

<Problem>

In the conventional image forming apparatus, in the case where, for example, a vertical band image with a high print ratio extending in the rotational direction of the developing roller 41 is formed in a large amount, there is a problem such that fixing of a substance derived from the toner 90 on the regulating blade 42 is liable to occur and thus an image quality lowers. This would be considered due to the following reason. Here, the print ratio can be expressed by a ratio (percentage) of the pixel number of the image portion to all the number of pixels in a noted predetermined region (an entire image forming region or a predetermined part of the image forming region), i.e., an areal ratio (percentage) of the image portion.

A part of the toner 90 is charged to a polarity opposite to the normal charge polarity by coating the surface of the toner 90 with a coating material for charging the toner 90 to the polarity opposite to the normal charge polarity of the toner 90 or by mutual friction (rubbing) between particles of the toner 90. By this, a substance of the polarity opposite to the normal charge polarity of the toner 90 (hereinafter, this substance is also referred to as a "reverse (opposite) polarity substance". Such an opposite polarity substance is liable to remain on the developing roller 41 by being partially separated from the surface of the toner 90 by an electric field formed between the photosensitive drum 1 and the developing roller 41 in the print portion during the image formation. On the other hand, the opposite polarity substance is liable to be transferred onto the photosensitive drum 1 by being partially separated from the surface of the toner 90 by an electric field formed between the photosensitive drum 1 and the developing roller 41 in the background portion during the image formation. Then, the opposite polarity substance transferred onto the photosensitive drum 1 in the background portion is removed by being transferred onto the recording material S or by being collected by the cleaning device 7.

For that reason, for example, in the case where in a certain position of the developing roller 41 with respect to the rotational axis direction (x-direction), the vertical band image with the high print ratio extending in the rotation direction (y-direction) of the developing roller 41 is formed in a large amount, the following phenomenon occurs in some instances. That is, in the position, the toner 90 is transferred in a large amount from the developing roller 41 onto the photosensitive drum 1, while the opposite polarity substance remains on the developing roller 41 and stagnates in the neighborhood of the regulating blade 42. As a result, a density of the opposite polarity substance relative to the toner 90 in the neighborhood of the regulating blade 42 becomes high, so that fixing of the opposite polarity substance on the regulating blade 42 occurs in some instances when the toner 90 passes through between the regulating blade 42 and the developing roller 41. Then, a fixed matter fixed on the regulating blade 42 blocks a flow of the toner 90, so that it becomes difficult to obtain a stable layer thickness of a toner layer on the developing roller 41, and thus a poor image density or a vertical stripe (herein, these defects are referred to as a "developing stripe") occurs in some cases.

The regulating stripe is liable to occur particularly in the case where a potential difference such that the potential of the regulating blade 42 as the blade bias A is larger than the potential of the developing roller 41 on the opposite side to the normal charge polarity of the toner is formed. This would be considered because the fixing of the opposite polarity substance onto the regulating blade 42 is liable to occur by pressing the opposite polarity substance toward the regulating blade 42 side by the electric field due to the blade bias A.

Further, the developing stripe is more liable to occur in the case where as the coating material, a substance has a charge polarity opposite to the normal charge polarity of the toner (toner particles) 90. This would be considered because the opposite polarity substance on the toner 90 causing the fixing increases.

Further, the developing stripe is also more liable to occur in the case where the vertical band image with the high print ratio extending in the rotation direction (y-direction) of the developing roller 41 in the position of the developing roller 41 with respect to the rotational axis direction (x-direction) of the developing roller 41 and in the case where the continuous image formation is carried out without stopping the drive of the image forming apparatus 100. This would be considered due to the following reason.

First, the case where the image forming job is intermittently performed plural times while interposing a stop operation of the image forming apparatus 100 would be considered. In this case, in this embodiment, the rotation distance of the developing roller 41 in the development contact state between image forming jobs is longer than the rotation distance of the developing roller 41 in a sheet interval in the case of the continuous image formation. This is due to the following reason. Impact of the developing roller 41 on the photosensitive drum 1 during the contact operation or during the separation operation has the influence on various image forming processes, so that there is a possibility that an image defect such as a horizontal stripe occurs. For example, in order to suppress the occurrence of such an image defect, an operation for changing the state from the development separation state to the development contact state is performed before the various image forming processes are started or an operation for changing the state from the development contact state to the development separation state after waiting until the various image forming processes are ended. For that reason, in the case where the image forming job is performed intermittently plural times while interposing a stop operation of the image forming apparatus 100, the developing roller 41 rotates in a longer distance in the development contact state during the non-image formation than in the case of the continuous image formation.

On the other hand, in the case of the continuous image formation, the rotation distance of the developing roller 41 during the non-image formation is shorter than in the case where the image forming job is performed intermittently plural times. As a result, the rotation distance of the developing roller 41 in the development contact state for transferring the opposite polarity substance from the developing roller 41 onto the photosensitive drum 1 becomes short. Further, the rotation distance of the developing roller 41 in the development separation state for diffusing, inside the developing device 4, the opposite polarity substance stagnating in a large amount in the neighborhood of the regulating blade 42 with formation of the image with the high print ratio becomes short. By this, in a state in which the opposite polarity substance is larger in amount than the toner 90 in the neighborhood of the regulating blade 42, the toner 90 passes through between the regulating blade 42 and the developing roller 41, and therefore, the fixing of the opposite polarity substance on the regulating blade 42 is liable to occur. For that reason, the developing stripe is more liable to occur in the case of the continuous image formation than in the case where the image forming job is performed intermittently plural times.

As described above, conventionally, occurrence of the poor image density and the vertical stripe due to the fixing or the fusion of the toner 90 onto the regulating blade 42 by the blade bias A have been suppressed. However, as described above, the problem such that the developing stripe due to the fixing of the opposite polarity substance derived from the toner 90 onto the regulating blade 42 occurs on the basis of a mechanism different from the mechanism of the fixing or the fusion of the toner 90 onto the regulating blade 42 which can be suppressed by the blade bias A still exists.

<Developing Rotation Operation>

Next, the developing rotation operation during the non-image formation in this embodiment will be described.

Part (a) of FIG. 3 is a flowchart showing an outline of a procedure of control of the developing rotation operation in this embodiment (herein, this control is also referred to as a "developing rotation operation control"). Further, part (b) of FIG. 3 is a flowchart showing an outline of a procedure of the image forming job in this embodiment. As shown in part (b) of FIG. 3, the controller 60 performs, at a predetermined timing, execution discrimination of the developing rotation operation and control so as to execute the developing rotation operation in a necessary case as shown in part (a) of FIG. 3.

(Procedure of Image Forming Job)

With reference to part (b) of FIG. 3, the outline of the image forming job in this embodiment will be described. In the image forming job, in addition to the image forming operation for carrying out the image formation (during image forming operation, during image formation), a pre-rotation operation, a sheet interval operation, a post-rotation operation, and the developing rotation operation which are non-image forming operations (during non-image forming operation, during non-image formation) are included. First, when the controller 60 starts the image forming job (S201), the controller 60 executes the pre-rotation operation for actuating rotation of the photosensitive drum 1 (S202), and then executes the image forming operation (S203). Next, the controller 60 discriminates whether or not subsequent image formation exists (S204). In the case where the controller 60 discriminated in S204 that the subsequent image formation exists in the image forming job for carrying out the continuous image formation ("Yes" of S204), the controller 60 discriminates whether or not image formation of 5 sheets is carried out from the last developing rotation operation control (S208). Then, in the case where the controller 60 discriminated that the image formation sheet number is less than 5 sheets ("No" of S208), after the sheet interval operation for conveying the recording material S is executed (S210), a subsequent image forming operation is executed (S203). Further, in the case where the controller 60 discriminated that the image formation sheet number from the last developing rotation operation control reached 5 sheets ("Yes" of S208), the controller 60 executes the developing rotation operation control described later (S209), and after the sheet interval operation is executed (S210), the subsequent image forming operation is executed (S203). Thereafter, the sequence returns to the discrimination as to whether or not the subsequent image formation exists, and a loop is formed until the subsequent image formation does not exist. Further, in the case where the controller 60 discriminated in S204 that there is no subsequent image formation ("No" of S204), after subsequent developing rotation operation control is executed (S205), the post-rotation operation for stopping the rotation of the photosensitive drum 1 is executed (S206). In this embodiment, during the post-rotation operation, a cleaning operation of the charging roller 2 is also performed before the rotation of the photosensitive drum 1 is stopped. When the post-rotation operation is ended, the controller 60 ends the image forming job (S207). Incidentally, processes of S205 and S209 in part (b) of FIG. 3 are the same as the processes of S101 to S107 in part (a) of FIG. 3 described later.

Thus, in this embodiment, when the image formation is continuously carried out during the image forming job, every image formation of 5 sheets, the developing rotation operation control is executed before subsequent image formation is carried out. Further, in this embodiment, when (immediately after in this embodiment) all the image forming operations of the image forming job are ended, the developing rotation operation control is executed. In this embodiment, in order to eliminate the influence of an operation time of the developing rotation operation, i.e., a rotation time of the developing roller 41 in the developing rotation operation (herein, simply referred to as a "rotation time") to the extent possible, the developing rotation operation control is executed when all the image forming operations of the image forming job are ended. Further, the image formation sheet number during the execution of the developing rotation operation control is large, there is a possibility that the rotation time of one (single) developing rotation operation becomes long. For that reason, in this embodiment, the developing rotation operation control is executed every time when image formation of a predetermined number of sheets is carried out during the image forming job for carrying out continuous image formation and when all the image forming operations of the image forming job are ended. Incidentally, a timing when the developing rotation operation control is executed is not limited to the timing in this embodiment. For example, the developing rotation operation may be executed every time when image formation of one sheet is carried out or may also be executed immediately after the pre-rotation operation or the like.

(Procedure of Developing Rotation Operation Control)

With reference to part (a) of FIG. 3, the outline of the procedure of the developing rotation operation control in this embodiment will be described. First, when the controller 60 starts the developing rotation operation control (S101), the controller 60 acquires information of the cumulative developing rotation distance D as a predetermined period and information of the maximum cumulative pixel number Pmax as a maximum print amount in the predetermined period (S102). The cumulative developing rotation distance D is a value obtained by integrating rotation distances of the developing roller 41 in the development contact state in the image forming operation (during the image forming operation) and all of the pre-rotation operation, the sheet interval operation, the post-rotation operation, and the developing rotation operation which are the non-image forming operations (during the non-image forming operations). Further, the maximum cumulative pixel number Pmax is acquired on the basis of the cumulative pixel number Px in each region Ax in a predetermined period by the pixel number counting portion 61 as described above. Then, the controller 60 determines a predetermined (cumulative pixel number threshold) Pth as described later (S103). Then, the controller 60 compares the maximum cumulative pixel number Pmax and the predetermined threshold Pth with each other, and discriminates whether or not the maximum cumulative pixel number Pmax exceeds the threshold Pth (S104). Then, in the case where the controller 60 discriminated that the maximum cumulative pixel number Dmax exceeds the threshold Pth ("Yes" of S104), the controller 60 determines a rotation distance Dadd and a rotation time Tadd which are necessary in the developing rotation operation (S105). Thereafter, the controller 60 executes the developing rotation operation for the determined rotation time Tadd (S106), and then ends the developing rotation operation control (S107). Further, in the case where the controller 60 discriminated in S104 that the maximum cumulative pixel number Pmax does not exceed the threshold Pth (less than the threshold Pth) ("No" of S104), the controller 60 ends the developing rotation operation (S107).

Here, in order to perform execution discrimination of the developing rotation operation, there is a need to detect that the state is close to a state in which the development stripe is liable to occur. That is, in a certain position of the developing roller 41 with respect to the rotational axis direction (x-direction), there is a need to detect that a vertical band image with a high print ratio extending in the rotational direction (y-direction) of the developing roller 41 is formed in a large amount. For that reason, in this embodiment, the case where the maximum cumulative pixel number Pmax in the cumulative developing rotation distance D exceeds the threshold Pth is detected. As described specifically later, in this embodiment, the threshold Pth is a value of the maximum cumulative pixel number Pmax at which there is a possibility that the development stripe starts to generate in the case where the developing rotation operation is not performed. Further, in this embodiment, when such a case is detected, in order to suppress the generation (occurrence) of the development stripe, the developing rotation operation for rotating the developing roller 41 and the photosensitive drum 1 during the non-image formation is performed. By this, the density of the opposite polarity substance to the toner 90 in the neighborhood of the regulating blade 42 is decreased. As described specifically later, in this embodiment, the rotation time Tadd of the developing rotation operation is determined on the basis of the maximum cumulative pixel number Pmax, the threshold Pth, and the cumulative developing rotation distance D.

Further, the case where the maximum cumulative pixel number P may exceed the threshold Pth refers to the case where the cumulative pixel number Px exceeds the threshold Pth in at least one of the plurality of regions A1 to An. That is, ease of the occurrence of the development stripe in each region Ax depends on the density of the opposite polarity substance in each region Ax. For that reason, the ease of the occurrence of the development stripe in each region Ax depends on the cumulative pixel number Px which is the print amount in each region Ax. Accordingly, in this embodiment, in order that the occurrence of the development stripe can be suppressed in any roller Ax, the developing rotation operation is performed in the case where the cumulative pixel number Px exceeds the threshold Pth even in one region.

In this embodiment, the print amount is separated after division of the rotation with respect to the rotational axis direction (x-direction) of the developing roller 41.

For that reason, in this embodiment, compared with a method of detecting the print amount without dividing the entire rotation with respect to the rotational axis direction (x-direction) of the developing roller 41, it is possible to more appropriately detect the case where the developing rotation operation is needed and the necessary rotation time. By this, in this embodiment, appropriate execution discrimination of the developing rotation operation and appropriate determination of the rotation time of the developing rotation operation can be performed, so that the occurrence of the development stripe can be suppressed while shortening a waiting time of a user due to the developing rotation operation.

(Operation Setting During Developing Rotation Operation)

In this embodiment, during the developing rotation operation, the developing roller 41 and the photosensitive drum 1 are rotated by the rotation time Tadd. Further, in this embodiment, during the developing rotation operation, a potential difference ΔVd3 is formed between the photosensitive drum 1 and the developing roller 41. At this time, in this embodiment, between the photosensitive drum 1 and the developing roller 41, the potential difference ΔVd3 such that the potential of the photosensitive drum 1 is higher than the potential (developing bias) of the developing roller 41 on the same polarity (negative polarity) side as the normal charge polarity of the toner 90. By this, the opposite polarity substance (positive-polarity substance) on the developing roller 41 is easily transferred onto the photosensitive drum 1.

In this embodiment, the potential difference ΔVd3 between the photosensitive drum 1 and the developing roller 41 during the developing rotation operation is made the same value as a potential difference ΔVd2 between the photosensitive drum 1 and the developing roller 41 in the background portion during the image formation. That is, in this embodiment, the developing bias Vdev during the developing rotation operation is −350 V which is the same as the developing bias Vdev during the image formation. Further, in this embodiment, the regulating bias Vb1-d during the developing rotation operation is −450 V which is the same as the regulating bias Vb1-d during the image formation. Further, in this embodiment, the charging bias during the developing rotation operation is −1100 V which is the same as the charging bias during the image formation. Further, in this embodiment, during the developing rotation operation, the photosensitive drum 1 (substantially entire area of the image forming region with respect to the rotational axis direction of the developing roller 41) is subjected to background exposure with the same emission intensity as the emission intensity of the background portion during the image formation by the exposure device 31. That is, in this embodiment, a surface potential Vd3 of the photosensitive drum 1 (substantially entire area of the image forming region with respect to the rotational axis direction of the developing roller 41) during the developing rotation operation is −550 V which is the same as the surface print Vd2 of the photosensitive drum 1 at the background portion during the image formation. By this, in this embodiment, the potential difference ΔVd3 (=Vd3−Vdev) between the surface potential Vd3 of the photosensitive drum 1 and the developing bias Vdev during the developing rotation operation is −200 V.

During the developing rotation operation, the opposite polarity substance transferred from the developing roller 41 onto the photosensitive drum 1 is collected by the transfer roller 51 and the cleaning device 7, so that a density of the opposite polarity substance to the toner 90 inside the developing device 4 is decreased. As a result, in a state in which the opposite polarity substance is smaller in amount than the toner 90, the toner 90 passes through between the regulating blade 42 and the developing roller 41, and therefore, it is possible to suppress the occurrence of the fixing (sticking) of the opposite polarity substance to the regulating blade 42.

Further, as another action by the developing rotation operation, the opposite polarity substance can be diffused inside the developing device 4. That is, both the rotation of the developing roller 41 in the development contact state and the rotation of the developing roller 41 in the development separation state are capable of diffusing, at the inside of the developing device 4, the opposite polarity substance stagnating in a large amount in the neighborhood of the regulating blade 42 with the formation of the image with the high print ratio. By this, the density of the opposite polarity substance to the toner 90 passing through between the regulating blade 42 and the developing roller 41 is further decreased, so that the occurrence of the fixing of the opposite polarity substance to the regulating blade 42 can be suppressed.

Incidentally, in this embodiment, in order to enhance an effect of suppressing the occurrence of the development stripe in a short rotation time to the extent possible, the developing rotation operation is performed in the development contact state higher in effect than in the development separation state. That is, in this embodiment, the rotation distance Dadd and the rotation time Tadd which are necessary in the developing rotation operation are set on the basis of the effect in the development contact state. In the case where the developing rotation operation is performed in the development separation state, in order to obtain the same effect as in the case where the developing rotation operation is performed in the development contact state, a longer rotation time is needed, so that there is a possibility that a waiting time of the user increases. That is, by performing the developing rotation operation in the development contact state, the waiting time of the user due to the developing rotation operation can be made shorter while suppressing the occurrence of the development stripe.

(Threshold Pth)

Next, a setting method of the threshold Pth will be described. The threshold Pth is the maximum cumulative pixel number Pmax in which there is a possibility of a start of the occurrence of the development stripe in the case where the developing rotation operation is not performed, and can be set on the basis of an image evaluation result in the case where the developing rotation operation is not performed.

In the constitution of this embodiment, the case where an image forming job for continuously forming letter-side images each with a certain print ratio on sheets from an initial state of the toner 90 without performing the developing rotation operation (herein, this job is referred to as a "predetermined image forming job") will be described as an example. In this case, the development stripe does not occur when an integrated print ratio with respect to the rotational direction (y-direction) of the developing roller 41 is a predetermined print ratio or less. In the constitution of this embodiment the predetermined print ratio is 22%. For example, in the case where the print ratio of the image in the above-described predetermined image forming job is 5%, the background portion where the opposite polarity substance is transferred from the developing roller 41 onto the photosensitive drum 1 is large in area. For that reason, the density of the opposite polarity substance to the toner 90 is decreased, and therefore, the development stripe due to the fixing of the opposite polarity substance to the regulating blade 42 does not occur. On the other hand, in the case where the print ratio of the image in the above-described predetermined image forming job is higher than the above-described predetermined print ratio (22%), an increasing speed of the density of the opposite polarity substance to the toner 90 is fast, and therefore, the development stripe occurs.

In this embodiment, the threshold Pth is set on the basis of an inclination K of the maximum cumulative pixel number Pmax to the cumulative developing rotation distance D in the case where the print ratio of the image in the predetermined image forming job is the predetermined print ratio (22%).

That is, in the case where the print ratio of the image in the predetermined image forming job is higher than the predetermined print ratio (22%), an inclination of the maximum cumulative pixel number Pmax to the cumulative developing rotation distance D is larger than the above-described inclination K. For that reason, in this case, when the image formation is continued as it is, the development stripe occurs due to the increase in density of the opposite polarity substance to the toner 90. Here, a graph in which the abscissa represents the cumulative developing rotation distance D and the ordinate represents the maximum cumulative pixel number Pmax is referred to as a "graph DP" (see FIGS. 4 to 7). Further, in the graph DP, a region in which the development stripe occurs as described above is referred to as a "region H" (see FIGS. 4 to 7). In the case where a plot of the cumulative developing rotation distance D and the maximum cumulative pixel number Pmax is in the region H on the graph DP, a state in which the development stripe is liable to occur is formed. Accordingly, in the case where the inclination of the maximum cumulative pixel number Pmax to the cumulative developing rotation distance D is larger than the above-described inclination K (in the case where the plot is in the region H on the graph DP), the developing rotation operation is needed.

Therefore, in this embodiment, by setting the threshold Pth along the inclination K, the development stripe is prevented from occurring. Further, in this embodiment, by the developing rotation operation, the cumulative developing rotation distance D after the developing rotation operation is made large, so that the inclination of the maximum cumulative pixel number Pmax to the cumulative developing rotation distance D after the developing rotation operation is made the inclination K or less (i.e., the plot is positioned outside the region H on the graph DP).

In the constitution of this embodiment, the cumulative developing rotation distance D per formation of the image on one sheet measured in the case where the print ratio of the image in the above-described image forming job is the above-described predetermined print ratio (22%) is 0.445 m. On the other hand, the maximum cumulative pixel number Pmax per formation of the image on one sheet measured at this time is 116 k pixels. Accordingly, in this embodiment, the inclination K for setting the threshold Pth is a value obtained by dividing the maximum cumulative pixel number Pmax by the cumulative developing rotation distance D in this case, i.e., 254*k* pixels/m. Then, in this embodiment, the threshold Pth is set in proportion to the value of the cumulative developing rotation distance D by using this inclination K. That is, in this embodiment, the controller 60 determines the threshold Pth by the following formula 1.

Incidentally, information of the inclination K is acquired in advance and is stored in the storing portion 63.

$$Pth = K * D \quad \text{formula 1}$$

By setting the threshold Pth as described above, the developing rotation operation can be performed in the case where the inclination of the maximum cumulative pixel number Pmax to the cumulative developing rotation distance D is larger than the inclination K (in the case where the plot is in the region H on the graph DP). By this, the density of the opposite polarity substance to the toner 90 is decreased, so that the occurrence of the development stripe can be suppressed. Further, in the case where the inclination of the maximum cumulative pixel number Pmax to the cumulative developing rotation distance D is the inclination K or less (in the case where the plot is positioned outside the region H on the graph DP), the developing rotation operation is not needed, so that it is possible that the developing rotation operation is not performed.

Thus, in this embodiment, depending on whether or not the maximum cumulative pixel number Pmax exceeds the threshold Pth, whether or not the developing rotation operation should be performed is discriminated. By this, while suppressing the occurrence of the development stripe, the developing rotation operation is not performed in the case where the developing rotation operation is not needed, so that the waiting time of the user can be shortened.

Further, in this embodiment, the threshold Pth is set smaller with a smaller value of the cumulative developing rotation distance D which is the rotation distance of the developing roller 41 in the predetermined period. By this, while suppressing the occurrence of the development stripe, the developing rotation operation is not performed more appropriately in the case where the developing rotation operation is not needed, so that the waiting time of the user can be further shortened.

Further, in this embodiment, as the predetermined period, the cumulative developing rotation distance D which is the rotation distance of the developing roller 41 from the initial state of the toner 90 is used. By this, the case where the plot is in the region H on the graph DP in which the state such that the development stripe is liable to occur is formed can be detected. For example, in a certain position with respect to the rotational axis direction (x-direction) of the developing roller 41, the vertical band image with the high print ratio is formed in a large amount after an image with a low print ratio is formed in a large amount, the density of the opposite polarity substance to the toner 90 is decreased by the formation of the image with the low print ratio. For that reason, there is a case that the developing rotation operation when the image with the high print ratio is formed is not needed. This can be understood that the plot is moved to a position out of the region H on the graph DP by the formation of the image with the low print ratio. Further, thereafter, a vertical band image with a further high print ratio is formed in a large amount, so that the developing rotation operation is not needed in some cases.

This can be understood that the plot enters the region H on the graph DP. Further, also, in the case where the continuous image formation number during the image forming job in which the vertical band image with the high print ratio is formed is small, the developing roller 41 is rotated in a large number of turns, whereby the developing rotation operation is not needed in some cases. This can also be understood that the plot on the graph DP is moved to a position out of the region H.

(Rotation Time of Developing Rotation Operation)

Next, a setting method of the rotation distance Dadd and the rotation time Tadd which are necessary in the developing rotation operation will be described.

In this embodiment, in order to prevent the development stripe from occurring, the developing rotation operation is performed until the maximum cumulative pixel number Pmax becomes the threshold Pth or less. That is, the cumulative developing rotation distance D after the developing rotation operation is made large by the developing rotation operation, so that the inclination of the maximum cumulative pixel number Pmax to the cumulative developing rotation distance D after the developing rotation operation is made the inclination K or less (i.e., is positioned outside the region H). In other words, by this, a value obtained by dividing the number of pixels in each of the plurality of regions A1 to An in the predetermined period by the rotation distance of the developing roller 41 in the predetermined period and in the developing rotation operation becomes the threshold Pth or less in each of all the regions A1 to An.

Incidentally, when the developing rotation operation takes a long time, there is a possibility that the developing rotation operation has the influence on the waiting time of the user. For that reason, in this embodiment, the developing rotation operation for a rotation time longer than the rotation time in which the maximum cumulative pixel number Pmax becomes the threshold Pth or less is not performed. That is, the controller 60 can determine the rotation distance Dadd by a formula 2 below. In this embodiment, on the basis of the above-described formulas 1 and 2, by the following formula 3, the controller 60 determines the rotation distance Dadd from the maximum cumulative pixel number Pmax, the threshold Pth, and the cumulative developing rotation distance D.

$$Dadd = (P\max - Pth)/K \quad \text{formula 2}$$

$$Dadd = (P\max - Pth) * D - D \quad \text{formula 3}$$

Thus, in this embodiment, the rotation distance Dadd of the developing rotation operation is set larger with a degree such that the maximum cumulative pixel number Pmax is larger than the threshold Pth.

Further, in this embodiment, the controller 60 determines the rotation time Tadd by dividing the rotation distance Dadd by the rotation speed of the developing roller 41. Further, the controller 60 carries out control so as to perform the developing rotation operation corresponding to the calculated rotation time Tadd.

By setting the rotation distance Dadd and the rotation time Tadd as described, the rotation time of the developing rotation operation is shortened as much as possible, and while preventing the waiting time of the user due to the developing rotation operation from becoming long, the occurrence of the development stripe can be suppressed by the developing rotation operation.

Example of Control Result

Next, a control result of control in this embodiment is illustrated as an example, and an evaluation result of control in respective embodiments and examples will be described.

From an initial state of the toner in each of operations in the following modes different in image forming job, formation of images on 600 sheets (recording materials) was carried out. In each of all the operations in the modes described below, the formation of images on letter-size recording materials S was carried out. Further, in all the operations in the modes, the image formation was carried out in an environment of a temperature of 23° ° C. and a relative humidity of 50% RH. Further, each mode was evaluated in terms of a degree of the occurrence of the development stripe by the following evaluation method. Further, in order to make comparison with this embodiment, also, as regards modified embodiments A and B and comparison examples 1 and 2, by a method similar to the method in the case of this embodiment, a control result of each modified embodiment (comparison example) is illustrated as an example, and an evaluation result of control in each modified embodiment (comparison example) will be described.

(Mode)

A first mode is a mode in which an image forming job for continuously forming first images on 25 sheets is executed once or more. The first image is an image with a print ratio of 0 to 5% integrated with respect to the rotational direction (y-direction) of the developing roller 41 in each region Ax in the rotational axis direction (x-direction) of the developing roller 41. A maximum print ratio which is a maximum value of print ratios of the respective regions Ax in the first images is 5%.

A second mode is a mode in which an image forming job for continuously forming second images on 25 sheets is executed once or more. The second mode is different from the first mode only in print ratio of the image. The second image is an image which is a print ratio of 30% integrated with respect to the rotational direction (y-direction) of the developing roller 41 in a position with a width of 10 mm with respect to the rotational axis direction (x-direction) of the developing roller 41 and which has a print ratio of 0% integrated with respect to the rotational direction (y-direction) of the developing roller 41 in other positions with respect to the rotational axis direction (x-direction) of the developing roller 41. A maximum print ratio which is a maximum value of print ratios in the respective regions Ax in the second images is 30%. The second mode is a mode with an image larger in maximum print ratio than in the first mode.

A third mode is a mode in which the operation in the first mode is executed first and then the operation in the second mode for forming the images on the sheets in the same number as the number of sheets in the operation in the first mode. That is, the third mode is a mode in which images are formed on 300 sheets in the operation in the first mode with the maximum print ratio of 5% and thereafter images are formed on 300 sheets in the operation in the second mode with the maximum print ratio of 30%.

A fourth mode is a mode in which the operation in the second mode is executed first and then the operation in the first mode for forming the images on the sheets in the same number as the number of sheets in the operation in the second mode. That is, the fourth mode is a mode in which images are formed on 300 sheets in the operation in the second mode with the maximum print ratio of 30% and thereafter images are formed on 300 sheets in the operation in the first mode with the maximum print ratio of 5%.

A fifth mode is a mode in which an image forming job for forming the above-described second image on one (single) sheet is intermittently executed a plurality of times (herein, this job is referred to as "one-sheet intermittence"). In the case where images are formed on 600 sheets in the operation in the fifth mode, the number of times of the image forming job is 600 times.

A sixth mode is a mode in which an image forming job for forming the second images on 25 sheets is intermittently executed a plurality of times (herein, this job is referred to as "25-sheet intermittence"). The sixth mode is a mode larger than the fifth mode in continuous image formation sheet number during the image forming job. Further, between the sixth mode and the fifth mode, in the case where images are formed on sheets in the same number, the number of execution times of the image forming job is smaller in the sixth mode than in the fifth mode. In the case where the images are formed on 600 sheets, the number of execution times of the image forming job is 24 times.

A seventh mode is a mode in which the operation in the fifth mode is executed first and then the operation in the sixth mode for forming the images on the sheets in the same number as the number of sheets in the operation in the fifth mode. That is, the seventh mode is a mode in which images are formed on 300 sheets in the operation in the sixth mode of the one-sheet intermittence and thereafter images are formed on 300 sheets in the operation in the sixth mode of the 25-sheet intermittence.

An eighth mode is a mode in which the operation in the sixth mode is executed first and then the operation in the fifth mode for forming the images on the sheets in the same number as the number of sheets in the operation in the sixth mode. That is, the eighth mode is a mode in which images are formed on 300 sheets in the operation in the sixth mode of the 25-sheet intermittence and thereafter images are formed on 300 sheets in the operation in the fifth mode of the one-sheet intermittence.

(Evaluation Method of Development Stripe)

The development stripe was discriminated by eye observation on the basis of the following criterion after outputting an image obtained by superposing a solid black image of 10 mm in the rotational direction of the developing roller 41 in image formation for every formation of images are 100 sheets. Incidentally, in the following description, an influence of this evaluation image is small and therefore is negligible.

O: Vertical stripe image did not occur.

X: Vertical stripe image occurred.

The modified embodiment A is different from this embodiment in the following point. In the modified embodiment A, a predetermined period is the image formation sheet number in a predetermined timing when the developing rotation operation is performed. Further, in the modified embodiment A, the threshold Pth is a value depending on, as the predetermined period, the image formation sheet number (1 to 5 sheets) from the last developing rotation operation control. That is, in the modified embodiment A, irrespective of information of the rotation distance of the developing roller 41, discrimination of execution of the developing rotation operation and calculation of the rotation time of the developing rotation operation are made on the basis of information of the image formation sheet number and the maximum cumulative pixel number Pmax from the last developing rotation operation control.

In the modified embodiment A, the threshold Pth is set as follows. As described above, the print ratio at which the development stripe starts to occur in the case where the predetermined image forming job (25-sheet intermittence) was executed is the predetermined print ratio (22% in the constitution of this embodiment). Further, a value of the maximum cumulative pixel number Pmax in each image formation sheet number (1 to 5 sheets) as the predetermined period in the case where the image was formed at this predetermined print ratio is the threshold Pth. Further, in the modified embodiment A, the rotation distance Dadd is a value calculated by the above-described formula 2.

By this, in the modified embodiment A, similarly as in this embodiment, in order to suppress the occurrence of the development stripe, the inclination of the maximum cumulative pixel number Pmax to the cumulative developing rotation distance D after the developing rotation operation is made the inclination K (i.e., the plot is positioned outside the region H on the graph DP). Other points of the modified embodiment A are the same as those in this embodiment.

The modified embodiment B is different from this embodiment in the following point. In the modified embodiment B, a predetermined period is the rotation distance of the developing roller 41 in a predetermined timing when the developing rotation operation is performed. Further, in the modified embodiment B, the threshold Pth is a value obtained by multiplying, as the predetermined period, the rotation distance of the developing roller 41 (1 to 5 sheets) from the last developing rotation operation control by the inclination K.

By this, in the modified embodiment B, similarly as in this embodiment, in order to suppress the occurrence of the development stripe, the inclination of the maximum cumulative pixel number Pmax to the cumulative developing rotation distance D after the developing rotation operation is made the inclination K (i.e., the plot is positioned outside the region H on the graph DP). Other points of the modified embodiment B are the same as those in this embodiment.

The comparison example 1 is different from this embodiment in the following point. In the comparison example 1, the developing rotation operation is not performed.

Other points of the comparison example 1 are the same as those in the comparison example 1.

The comparison example 2 is different from this embodiment in the following point. In the comparison example 2, in counting of the cumulative pixel number Px by the pixel number counting portion 61, a region of the photosensitive drum 1 with a letter-size width with respect to the rotational axis direction (x-direction) of the developing roller 41 is counted as a whole without being divided, and a resultant value is the maximum cumulative pixel number Pmax. Further, in the comparison example 2, the threshold Pth is set so that a ratio of the threshold Pth to an area of the photosensitive drum 1 in each region Ax becomes the same as a ratio of the threshold Pth to an area of the photosensitive drum 1 in each region Ax in this embodiment. That is, in the comparison example 2, in the case where setting is made so as to perform the developing rotation operation for a rotation time necessary to suppress the occurrence of the development stripe in the case where a vertical band image with the predetermined print ratio (22%) or more in all the regions with respect to the rotational axis direction (x-direction) in the above-described predetermined image forming job (25-sheet intermittence). Other points in the comparison example 2 are the same as those in this embodiment.

(Evaluation Result)

A table 1 shows an evaluation result of the development stripe in the operation in each mode in the associated embodiments (comparison examples).

TABLE 1

| | MODE EMB. 1 | MOD. EMB. A | MOD. EMB. B | COMP. EX. 1 | COMP. EX. 2 |
|---|---|---|---|---|---|
| FIRST | ○ | ○ | ○ | ○ | ○ |
| SECOND | ○ | ○ | ○ | x | x |
| THIRD | ○ | ○ | ○ | ○ | ○ |
| FOURTH | ○ | ○ | ○ | x | x |
| FIFTH | ○ | ○ | ○ | ○ | ○ |
| SIXTH | ○ | ○ | ○ | x | x |
| SEVENTH | ○ | ○ | ○ | ○ | ○ |
| EIGHTH | ○ | ○ | ○ | x | x |

A table 2 shows a value of the cumulative developing rotation distance D after the images were formed on 600 sheets in the operation in each mode in the associated embodiments (comparison examples) (herein, this is also referred to as "after all image formation").

TABLE 2

| | CUMULATIVE DEVELOPMENT ROTATION DISTANCE D [m] | | | | |
|---|---|---|---|---|---|
| | MODE EMB. 1 | MOD. EMB. A | MOD. EMB. B | COMP. EX. 1 | COMP. EX. 2 |
| FIRST | 264 | 264 | 264 | 264 | 264 |
| SECOND | 372 | 372 | 372 | 264 | 264 |
| THIRD | 264 | 318 | 318 | 264 | 264 |
| FOURTH | 318 | 318 | 318 | 264 | 264 |
| FIFTH | 511 | 619 | 511 | 511 | 511 |
| SIXTH | 372 | 372 | 372 | 264 | 264 |
| SEVENTH | 388 | 496 | 442 | 388 | 388 |
| EIGHTH | 442 | 496 | 442 | 388 | 388 |

(First Mode and Second Mode)

Parts (a) to (e) of FIG. 4 each shows a relationship (graph DP) between the cumulative developing rotation distance D and the maximum cumulative pixel number Pmax in the case where the image formation was carried out in the operations in the first and second modes in an associated one of the embodiments and the comparison examples described above.

Incidentally, in the graph DP of each of parts (a) to (e) of FIG. 4, a plot of the cumulative developing rotation distance D and the maximum cumulative pixel number Pmax changes from an origin which is an initial state of the toner 90 in an upper right direction when the image formation sheet number increases. In the graph DP of each of parts (a) to (e) of FIG. 4, the plot in the operation in each mode shows a result until the image formation sheet number of 600 sheets every image formation sheet number of 100 sheets. Further, in each graph DP of FIG. 4, the region H represents a region in which the development stripe occurs in the case where the image formation is continued with the above-described inclination K. That is, a region above a line of the inclination K is the region H. This is also true for FIGS. 5 to 7 described later.

In the comparison example 1, as shown in table 1, although the development stripe did not occur in the operation in the first mode, the development stripe occurred at a point of time when the images were formed on 300 sheets in the operation in the second mode higher than the operation in the first mode in maximum print ratio of the image formation. This is because as shown in part (d) of FIG. 4, the image formation was continued in a state in which the plot enters the region H on the graph DP, i.e., in a state in which the density of the opposite polarity substance to the toner 90 increases.

Further, also, in the comparison example 2, as shown in table 1, although the development stripe did not occur in the operation in the first mode, the development stripe occurred at the point of time when the images were formed on 300 sheets in the operation in the second mode higher than the operation in the first mode in maximum print ratio of the image formation. This is because as shown in part (e) of FIG. 4, the image formation was continued in a state in which the plot enters the region H on the graph DP, i.e., in a state in which the density of the opposite polarity substance to the toner 90 increases. In the comparison example 2, as in the operation in the second mode, in the case where the image formation with the high print ratio is carried out only at a part of the sheet with respect to the rotational axis direction (x-direction) of the developing roller 41, a necessary developing rotation operation cannot be performed. As a result, the development stripe occurred. If the necessary developing rotation operation is intended to be performed for suppressing the occurrence of the development stripe in the case where the image formation as in the operation in the second mode is carried out, there is a need to set the threshold Pth to a low value.

However, when the threshold Pth is set to the low value, the developing rotation operation is performed for a long time also in the case where the image with the maximum print ratio which is relatively low as in the operation in the first mode in which the development stripe does not occur is formed in a large amount.

For that reason, a waiting time of the user due to the developing rotation operation becomes long.

On the other hand, in this embodiment and in the modified embodiments A and B, as shown in the table 1, the development stripe did not occur even in the operation in the second mode by a decrease in density of the opposite polarity substance to the toner 90 by the developing rotation operation. As shown in parts (a) to (c) of FIG. 4, in this embodiment and in the modified embodiments A and B, the developing rotation operation is executed so that the plot does not enter the region H on an upper side of the inclination K line on the graph DP. That is, the threshold Pth is set along the inclination K line. Thus, in this embodiment and in the modified embodiments A and B, the developing rotation operation is performed so that the plot does not enter the region on the graph DP. For that reason, different from the comparison examples 1 and 2, the image formation is not continued in the state in which the density of the opposite polarity substance to the toner 90 increased as in the comparison examples 1 and 2, so that the occurrence of the development can be suppressed.

Here, such a characteristic of this embodiment and the modified embodiments A and B appears in relationship of the cumulative developing rotation distance D after all image formation between the first mode and the second mode. In this embodiment and in the modified embodiments A and B, as shown in the table 2 and parts (a) to (c) of FIG. 4, the developing rotation operation is executed so that the cumulative developing rotation distance D after all image formation becomes longer in the operation in the second mode than in the operation in the first mode. On the other hand, in the comparison examples 1 and 2, as shown in the table 2 and parts (d) and (e) of FIG. 4, the developing rotation operation is not executed, and therefore, the cumulative developing rotation distances D after all image formation become the same value between the operation in the first mode and the operation in the second mode.

Further, in this embodiment and in the modified embodiments A and B, the print amount is detected in a division manner with respect to the rotational axis direction (x-direction) of the developing roller 41. For that reason, in this embodiment and in the modified embodiments A and B, compared with a method as in the comparison example 2 such that the print amount is detected without dividing the area over the entire region with respect to the rotational axis direction (x-direction) of the developing roller 41, in the case of the operation in the second mode, it is possible to more appropriately detect the case where the developing rotation operation is needed and a necessary rotation time. By this, in this embodiment and in the modified embodiments A and B, appropriate discrimination of the execution of the developing rotation operation and appropriate determination of the rotation time of the developing rotation operation can be made, so that it is possible to suppress the occurrence of the development stripe while shortening the waiting time of the user due to the developing rotation operation.

(Third Mode and Fourth Mode)

Parts (a) to (e) of FIG. 5 each shows a relationship (graph DP) between the cumulative developing rotation distance D and the maximum cumulative pixel number Pmax in the case where the image formation was carried out in the operations in the third and fourth modes in an associated one of the embodiments and the comparison examples described above.

In the comparison examples 1 and 2, as shown in table 1, although the development stripe did not occur in the operation in the third mode, the development stripe occurred at a point of time when the images were formed on 300 sheets in the operation in the second mode in the fourth mode. This is because as shown in parts (d) and (e) of FIG. 5, the image formation was continued in a state in which the plot enters the region H on the graph DP, i.e., in a state in which the density of the opposite polarity substance to the toner 90 increases.

On the other hand, in this embodiment and in the modified embodiments A and B, as shown in the table 1, the development stripe did not occur even in the operation in the fourth mode by a decrease in density of the opposite polarity substance to the toner 90 by the developing rotation operation. As shown in parts (a) to (c) of FIG. 5, in this embodiment and in the modified embodiments A and B, the developing rotation operation is executed so that the plot does not enter the region H on an upper side of the inclination K line on the graph DP. That is, the threshold Pth is set along the inclination K line. Thus, in this embodiment and in the modified embodiments A and B, the developing rotation operation is performed so that the plot does not enter the region on the graph DP. For that reason, different from the comparison examples 1 and 2, the image formation is not continued in the state in which the density of the opposite polarity substance to the toner 90 increased as in the comparison examples 1 and 2, so that the occurrence of the development can be suppressed.

Here, in this embodiment and the modified embodiments A and B, during image formation (former 300 sheets) in the operation in the second mode with the high maximum print ratio in the fourth mode, the developing rotation operation is executed for suppressing the occurrence of the development stripe. On the other hand, during image formation (latter 300 sheets) in the operation in the first mode with the low maximum print ratio in the fourth mode, the maximum print ratio is low, and therefore, the developing rotation operation is discriminated as being unnecessary, and thus is not executed.

Further, in the modified embodiments A and B, during the image formation (the former 300 sheets) in the operation in the first mode in the third mode, the maximum print ration is low, and therefore, the developing rotation operation is discriminated as being unnecessary and thus is not executed. On the other hand, during the image formation (the latter 300 sheets) in the operation in the second mode in the third mode, similarly as during the image formation (the former 300 sheets) in the operation in the second mode in the fourth mode, the formation of the vertical band image with the high print ratio in a large amount is detected, and the developing rotation operation is executed.

On the other hand, in this embodiment, in the operation in the third mode, not only during the image formation (the former 300 sheets) in the operation in the first mode but also during the image formation (the latter 300 sheets) in the operation in the second mode, the developing rotation operation is discriminated as being unnecessary and thus is not executed. As a result, as shown in the table 2, the cumulative developing rotation distance D after all image formation in the operation in the third mode is shorter in this embodiment than in the modified embodiments A and B. That is, the waiting time of the user due to the developing rotation operation can be made shorter in this embodiment than in the modified embodiments A and B while suppressing the occurrence of the development stripe.

The reason why the development stripe does not occur even when the developing rotation operation is not executed during the image formation (the latter 300 sheets) in the operation in the second mode in the third mode in this embodiment is as follows. That is, during the image formation (the former 300 sheets) in the operation in the first mode in which the image with the low print ratio is formed in a large amount, the density of the opposite polarity substance to the toner 90 is decreased. For that reason, during the subsequent image formation (the latter 300 sheets) in the operation in the second mode in which the vertical band image with the high print ratio is formed in a large amount, there is a latitude in an increase of the density of the opposite polarity substance to the toner 90 causing the occurrence of the development stripe. Accordingly, there is no need to decrease the density of the opposite polarity substance to the toner 90 by the developing rotation operation. This can also be described as follows. That is, as shown in part (a) of FIG. 5, in the operation in the third mode, the plot on the graph DP is moved to a position out of the region H by the image formation in the operation in the first mode from the initial state of the toner 90. By this, the plot does not enter the region H, in which the development stripe is liable to occur, on the graph DP. In this embodiment, as the predetermined period, the cumulative developing rotation distance D which is the rotation distance of the developing roller 41 from the initial state of the toner 90 is used, and therefore, even in the case such as the operation in the third mode, it is possible to more appropriately detect the case where the plot is in the region H, in which the development stripe is liable to occur, on the graph DP. By this, in this embodiment, compared with the modified embodiments A and B, appropriate discrimination of the execution of the developing rotation operation and appropriate determination of the rotation time of the developing rotation operation can be made, so that the occurrence of the development stripe can be suppressed while shortening the waiting time of the user due to the developing rotation operation.

Here, such a characteristic of this embodiment appears in relationship of the cumulative developing rotation distance D after all image formation between the third mode and the fourth mode. In this embodiment, as shown in the table 2 and part (a) of FIG. 5, the developing rotation operation is executed so that the cumulative developing rotation distance D after all image formation becomes longer in the operation in the fourth mode than in the operation in the third mode. On the other hand, in the modified embodiments A and B, as shown in parts (b) and (c) of FIG. 5, the developing rotation operation is executed even in the operation in the third mode, and therefore, the cumulative developing rotation distances D after all image formation become the same value between the operation in the third mode and in the operation in the fourth mode. Further, in the comparison examples 1 and 2, as shown in the table 2 and parts (d) and (e) of FIG. 5, the developing rotation operation is not executed, and therefore, the cumulative developing rotation distances D after all image formation become the same value between the operation in the third mode and the operation in the fourth mode.

(Fifth Mode and Sixth Mode)

Parts (a) to (e) of FIG. 6 each shows a relationship (graph DP) between the cumulative developing rotation distance D and the maximum cumulative pixel number Pmax in the case where the image formation was carried out in the operations in the fifth and sixth modes in an associated one of the embodiments and the comparison examples described above.

In the comparison examples 1 and 2, as shown in table 1, although the development stripe did not occur in the operation in the fifth mode, the development stripe occurred at a point of time when the images were formed on 300 sheets in the operation in the sixth mode larger than the operation in the fifth mode in continuous image formation sheet number during the image forming job. This is because as shown in parts (d) and (e) of FIG. 6, the image formation was continued in a state in which the plot enters the region H on the graph DP, i.e., in a state in which the density of the opposite polarity substance to the toner 90 increases.

In the comparison example 2, as in the operation in the sixth mode, in the case where the image formation with the high print ratio is carried out only at a part of the sheet with respect to the rotational axis direction (x-direction) of the developing roller 41, a necessary developing rotation operation cannot be performed. As a result, the development stripe occurred. If the necessary developing rotation operation is intended to be performed for suppressing the occurrence of the development stripe in the case where the image formation as in the operation in the sixth mode is carried out, there is a need to set the threshold Pth to a low value. However, when the threshold Pth is set to the low value, the developing rotation operation is performed for a long time also in the case where the continuous image formation sheet number relatively small as in the operation in the fifth mode in which the development stripe does not occur is formed in a large amount. For that reason, a waiting time of the user due to the developing rotation operation becomes long.

On the other hand, in this embodiment and in the modified embodiments A and B, as shown in the table 1, the development stripe did not occur even in the operation in the sixth mode by a decrease in density of the opposite polarity substance to the toner 90 by the developing rotation operation. As shown in parts (a) to (c) of FIG. 6, in this embodiment and in the modified embodiments A and B, the developing rotation operation is executed so that the plot does not enter the region H on an upper side of the inclination K line on the graph DP. That is, the threshold Pth is set along the inclination K line. Thus, in this embodiment and in the modified embodiments A and B, the developing rotation operation is performed so that the plot does not enter the region on the graph DP. For that reason, different from the comparison examples 1 and 2, the image formation is not continued in the state in which the density of the opposite polarity substance to the toner 90 increased as in the comparison examples 1 and 2, so that the occurrence of the development can be suppressed.

Further, in this embodiment and in the modified embodiments A and B, the print amount is detected in a division manner with respect to the rotational axis direction (x-direction) of the developing roller 41. For that reason, in this embodiment and in the modified embodiments A and B, compared with a method as in the comparison example 2 such that the print amount is detected without dividing the area over the entire region with respect to the rotational axis direction (x-direction) of the developing roller 41, in the case of the operation in the second mode, it is possible to more appropriately detect the case where the developing rotation operation is needed and a necessary rotation time. By this, in this embodiment and in the modified embodiments A and B, appropriate discrimination of the execution of the developing rotation operation and appropriate determination of the rotation time of the developing rotation operation can be made, so that it is possible to suppress the occurrence of the development stripe while shortening the waiting time of the user due to the developing rotation operation.

Here, in the modified embodiment A, during the image formation in the operation in the fifth mode, similarly as in the operation in the sixth mode, formation of the vertical band image with the high print ratio in the large amount is detected and the developing rotation operation is executed. On the other hand, in this embodiment and in the modified embodiment B, during the image formation, the developing rotation operation is discriminated as being unnecessary and thus is not executed. As a result, as shown in the table 2, the cumulative developing rotation distance D after all image formation in the operation in the fifth mode became shorter in this embodiment and the modified embodiment B than in the modified embodiment A. That is, in this embodiment and in the modified embodiment B, a waiting time of the user due to the developing rotation operation can be made shorter than in the modified embodiment A while suppressing the occurrence of the development stripe. In this embodiment and in the modified embodiment B, as the predetermined period, the rotation distance of the developing roller 41 including those during the image formation and during the non-image formation was used. On the other hand, in the modified embodiment A, as the predetermined period, the number of sheets during the image formation was used. For that reason, in this embodiment and in the modified embodiment B, in the case such as the operation in the fifth mode, it is possible to more appropriately detect the case where the plot is in the region H, in which the development stripe is liable to occur, on the graph DP than in the modified embodiment A. By this, in this embodiment and in the modified embodiment B, compared with the modified embodiment A, appropriate discrimination of the execution of the developing rotation operation and appropriate determination of the rotation time of the developing rotation operation can be made, so that the occurrence of the development stripe can be suppressed while shortening the waiting time of the user due to the developing rotation operation.

(Seventh Mode and Eighth Mode)

Parts (a) to (e) of FIG. 7 each shows a relationship (graph DP) between the cumulative developing rotation distance D and the maximum cumulative pixel number Pmax in the case where the image formation was carried out in the operations in the seventh and eighth modes in an associated one of the embodiments and the comparison examples described above.

In the comparison examples 1 and 2, as shown in table 1, although the development stripe did not occur in the operation in the seventh mode, the development stripe occurred at a point of time when the images were formed on 300 sheets in the operation in the sixth mode in the eighth mode. This is because as shown in parts (d) and (e) of FIG. 5, the image formation was continued in a state in which the plot enters the region H on the graph DP, i.e., in a state in which the density of the opposite polarity substance to the toner 90 increases.

On the other hand, in this embodiment and in the modified embodiments A and B, as shown in the table 1, the development stripe did not occur even in the operation in the eighth mode by a decrease in density of the opposite polarity substance to the toner 90 by the developing rotation operation. As shown in parts (a) to (c) of FIG. 7, in this embodiment and in the modified embodiments A and B, the developing rotation operation is executed so that the plot does not enter the region H on an upper side of the inclination K line on the graph DP. That is, the threshold Pth is set along the inclination K line. Thus, in this embodiment and in the modified embodiments A and B, the developing rotation operation is performed so that the plot does not enter the region on the graph DP. For that reason, different from the comparison examples 1 and 2, the image formation is not continued in the state in which the density of the opposite polarity substance to the toner 90 increased as in the comparison examples 1 and 2, so that the occurrence of the development can be suppressed.

Here, in this embodiment and the modified embodiment B, during image formation (former 300 sheets) in the operation in the sixth mode, with the large continuous image formation sheet number during the image forming job, in the eighth mode, the developing rotation operation is executed for suppressing the occurrence of the development stripe. On the other hand, during image formation (latter 300 sheets) in the operation in the fifth mode, with the small continuous image formation sheet number during the image forming job, in the eighth mode, the developing rotation operation is discriminated as being unnecessary, and thus is not executed.

Further, in the modified embodiment A, in either one of during the image formation (the former 300 sheets) in the operation in the sixth mode in the eighth mode, during the image formation (the latter 300 sheets) in the operation in the fifth mode in the eighth mode, during the image formation (the former 300 sheets) in the operation in the fifth mode in the seventh mode, and during the image formation (the latter 300 sheets) in the operation in the sixth mode in the seventh mode, formation of the vertical band image with the high print ratio in the large amount is detected, and the developing rotation operation is executed.

Further, in the modified embodiment B, during the image formation (the former 300 sheets) in the operation in the third mode in the seventh mode, the developing rotation operation is discriminated as being unnecessary and thus is not executed. On the other hand, in the modified embodiment B, during the image formation (the latter 300 sheets) in the operation in the sixth mode in the seventh mode, similarly as during the image formation (the former 300 sheets) in the operation in the sixth mode in the eighth mode, the formation of the vertical band image with the high print ratio, relative to the rotation distance of the developing roller

41, in the large amount is detected, and the developing rotation operation is executed.

On the other hand, in this embodiment, in the operation in the seventh mode, not only during the image formation (the former 300 sheets) in the operation in the fifth mode but also during the image formation (the latter 300 sheets) in the operation in the sixth mode, the developing rotation operation is discriminated as being unnecessary and thus is not executed. As a result, as shown in the table 2, the cumulative developing rotation distance D after all image formation in the operation in the seventh mode is shorter in this embodiment than in the modified embodiments A and B. That is, the waiting time of the user due to the developing rotation operation can be made shorter in this embodiment than in the modified embodiments A and B while suppressing the occurrence of the development stripe.

The reason why the development stripe does not occurrence even when the developing rotation operation is not executed during the image formation (the latter 300 sheets) in the operation in the sixth mode in the seventh mode in this embodiment is as follows. That is, during the image formation (the former 300 sheets) in the operation in the fifth mode in which the image with the low print ratio is intermittently formed in a plurality of times, the density of the opposite polarity substance to the toner 90 is decreased. For that reason, during the subsequent image formation (the latter 300 sheets) in the operation in the sixth mode in which the vertical band image with the high print ratio is continuously formed, there is a latitude in an increase of the density of the opposite polarity substance to the toner 90 causing the occurrence of the development stripe. Accordingly, there is no need to decrease the density of the opposite polarity substance to the toner 90 by the developing rotation operation. This can also be described as follows. That is, as shown in part (a) of FIG. 7, in the operation in the seventh mode, the plot on the graph DP is moved to a position out of the region H by the image formation in the operation in the fifth mode from the initial state of the toner 90. By this, the plot does not enter the region H, in which the development stripe is liable to occur, on the graph DP. In this embodiment, as the predetermined period, the cumulative developing rotation distance D which is the rotation distance of the developing roller 41 from the initial state of the toner 90 is used, and therefore, even in the case such as the operation in the seventh mode, it is possible to more appropriately detect the case where the plot is in the region H, in which the development stripe is liable to occur, on the graph DP. By this, in this embodiment, compared with the modified embodiments A and B, appropriate discrimination of the execution of the developing rotation operation and appropriate determination of the rotation time of the developing rotation operation can be made, so that the occurrence of the development stripe can be suppressed while shortening the waiting time of the user due to the developing rotation operation.

Here, such a characteristic of this embodiment appears in relationship of the cumulative developing rotation distance D after all image formation between the seventh mode and the eighth mode. In this embodiment, as shown in the table 2 and part (a) of FIG. 7, the developing rotation operation is executed so that the cumulative developing rotation distance D after all image formation becomes longer in the operation in the eighth mode than in the operation in the third mode. On the other hand, in the modified embodiments A and B, as shown in parts (b) and (c) of FIG. 7, the developing rotation operation is executed even in the operation in the seventh mode, and therefore, the cumulative developing rotation distances D after all image formation become the same value between the operation in the seventh mode and in the operation in the eighth mode. Further, in the comparison examples 1 and 2, as shown in the table 2 and parts (d) and (e) of FIG. 7, the developing rotation operation is not executed, and therefore, the cumulative developing rotation distances D after all image formation become the same value between the operation in the seventh mode and the operation in the eighth mode.

Thus, in this embodiment, the image forming apparatus 100 includes the rotatable image bearing member (photosensitive drum) 1; the charging device 2 configured to electrically charge a surface of the image bearing member 1; the exposure device 31 configured to expose a charged surface of the image bearing member 1 to form an image portion on the image bearing member 1 by an electrostatic latent image; the developing device 4 including the rotatable developer carrying member 41 configured to form a developer image on the image bearing member 1 by supplying a developer to the image portion of the image bearing member 1 and including the regulating member 42 configured to regulate the developer carried on the developer carrying member 41; the transfer means 51 configured to transfer the developer image, formed on the image bearing member 1, onto the recording material S; the counting means (pixel number counting portion) 61 configured to acquire the count value (pixel number) obtained by integrating a value correlating with an area of the image portion with respect to a direction along a surface movement direction of the developer carrying member 1 for each of a plurality of regions obtained by dividing a surface region of the image bearing member 1 with respect to a direction substantially perpendicular to the surface movement direction of the developer carrying member 1; the driving portion 126 configured to drive the developer carrying member 41; and the controller 60 capable of controlling the driving portion 126. The controller 60 performs an image forming operation capable of forming the developer image, on the image bearing member 1, to be transferred onto the recording material S and a non-image forming operation in which the developer image to be transferred onto the recording materials is not formed on the image bearing member 1. Further, in this embodiment, depending on each of count values in the plurality of regions acquired by the counting means 61 in a predetermined period, the controller 60 controls the driving portion 126 so as to change the rotation amount (rotation distance Dadd, rotation time Tadd) of the developer carrying member 41 in a developing rotation operation for rotating the developer carrying member 41 during the non-image forming operation.

In this embodiment, the controller 60 sets the predetermined period on the basis of the rotation amount (rotation distance) of the developer carrying member 41 both during the image forming operation and during the non-image forming operation.

Further, in this embodiment, the controller 60 sets the predetermined period on the basis of a cumulative rotation amount of the developer carrying member 41 from the initial state (during a new article of the developing device 4, during supply of a new developer to the developing device 4) of the developer in the developing device 4. Further, in this embodiment, in a case that the count value of at least one region of the count values in the plurality of regions acquired by the counting means 61 in the predetermined period exceeds the predetermined threshold Pth, the controller 60 controls the driving portion 126 so as to perform the developing rotation operation in a rotation amount of the developer carrying member 41 depending on the count value of the at least one region. Further, in this embodiment, the controller 60 sets the threshold to a first voltage in a case that the rotation amount of the developer carrying member 41 in the predetermined period is a first rotation amount and sets the threshold to a second value smaller than the first value in a case that the rotation amount of the developer carrying member 41 in the predetermined period is a second rotation amount smaller than the first rotation amount. Particularly, in this embodiment, in a case that a maximum value of the count values of the plurality of regions acquired by the counting means 61 in the predetermined period exceeds the threshold, the controller 60 performs the developing rotation operation in a rotation amount of the developer carrying member depending on the maximum value, wherein in a case that a difference between the threshold and the maximum value is a first difference, the controller sets the rotation amount of the developer carrying member in the developing rotation operation to a first amount, and wherein in a case that the difference between the threshold and the maximum value is a second difference larger than the first difference, the controller sets the rotation amount of the developer carrying member 41 in the developing rotation operation to a second amount larger than the first amount. Further, the controller 60 sets the rotation amount of the developer carrying member 41 in the developing rotation operation so that a value obtained by dividing each of the count values in the plurality of regions acquired by the counting means 61 in the predetermined period by the rotation amount of the developer carrying member in the predetermined period and in the developing rotation operation is the threshold or less in all the plurality of regions.

Further, in this embodiment, the image forming apparatus 100 includes the image bearing member driving portion 125 configured to drive the image bearing member; and a developing voltage applying portion 122 configured to apply a voltage to the developer carrying member 41, wherein the controller 60 controls the driving portion 126 and the image bearing member driving portion 125 so that the developing rotation operation is performed by rotating the developer carrying member 41 and the image bearing member 1 in a state in which the developer carrying member 41 contacts the image bearing member 1 and controls the charging device 2 and the developing voltage applying portion 122 so that the developing rotation operation is performed in a state in which a potential difference such that a surface potential of the image bearing member 1 is larger than a potential of the developer carrying member 41 on a side identical in polarity to a normal charge polarity of the developer is formed between the image bearing member 1 and the developer carrying member 41. Further, in this embodiment, the image forming apparatus 100 includes the image bearing member driving portion 125 configured to drive the image bearing member 1; and the contact and separation mechanism 80 configured to bring the image bearing member 1 into contact with and separation from the developer carrying member 41, wherein the controller 60 controls the driving portion 126, the image bearing member driving portion 125, and the contact and separation mechanism 80 so that the developing rotation operation is performed by rotating the developer carrying member 41 and the image bearing member 1 in a state in which the developer carrying member 41 contacts the image bearing member 1. Further, in this embodiment, the image forming apparatus 100 includes the developing voltage applying portion 122 configured to apply a voltage to the developer carrying member 41; and the regulating voltage applying portion 123 configured to apply a voltage to the regulating member 42, wherein the controller 60 controls the developing voltage applying portion 122 and the regulating voltage applying portion 123 so that a potential difference such that a potential of the regulating member 42 is larger than a potential of the developer carrying member 41 on a side identical in polarity to a normal charge polarity of the developer is formed between the regulating member 42 and the developer carrying member 41 during the image forming operation. Further, in this embodiment, the developer contains toner particles and a coating material having a charge polarity opposite to a normal charge polarity of the toner particles.

Further, a characteristic of the image forming apparatus 100 of this embodiment can be said to appear in the following operation result. That is, when a maximum value of print ratios each obtained by integrating a value correlating with an area ratio of the image portion of the electrostatic latent image with respect to a direction along a surface movement direction of the developer carrying member 41 for an associated one of a plurality of regions obtained by dividing a surface region of the image bearing member 1 with respect to the rotational axis direction of the developer carrying member 41 is defined as the maximum print ratio, the mode in which an image forming job for continuously forming images, each of which maximum print ratio is a first value, on a plurality of the recording materials S in a number of sheets is performed once or more is defined as a first mode, and the mode in which an image forming job for continuously forming images, each of which maximum print ratio is a second value larger than the first value, on the recording materials S in a same number of sheets as the number of sheets in the first mode is perform in a same number of times as a number of times in the first mode is defined as the second mode, an integrated value of a rotation amount of the developer carrying member both during the above-described image forming operation and during the above-described a non-image forming operation is larger in the second mode than in the first mode (part (A) to FIG. 4). Further, when a mode in which the images are formed on the recording materials S in the first mode and the second mode and in which an operation in the second mode is performed after an operation in the first mode is defined as the third mode, and the mode in which the images are formed on the recording materials S in the first mode and the second mode and in which the operation in the first mode is performed after the operation in the second mode is defined as the fourth mode, the integrated value of the rotation amount of the developer carrying member 41 during the image forming operation and during the non-image forming operation (part (a) of FIG. 5). Further, the mode in which an image forming job for continuously forming an image, which maximum print ratio is a predetermined value, on the recording materials S in a number of sheets of one or more is intermittently performed a plurality of times is defined as the fifth mode, and the mode in which an image forming job for continuously forming images, each of which maximum print ratio is the predetermined value, on the recording materials S in a number of sheets larger than the number of sheets in the fifth mode is intermittently per formed in a same number of times smaller than a number of times in the fifth mode is defined as the sixth mode, the mode in which the images are formed on the recording materials S in the fifth mode and the sixth mode and in which an operation in the sixth mode is performed after an operation in the fifth mode is defined as the seventh mode, and the mode in which the images are formed on the recording materials S in the fifth mode and the sixth mode and in which the operation in the fifth mode is performed after the operation in the sixth mode is defined as the eighth mode, the integrated value of a rotation amount of the developer carrying member both during the image forming operation and during the non-image forming operation is larger in the eighth mode than in the seventh mode (part (a) of FIG. 7).

As described above, according to this embodiment, a lowering in image quality due to the fixing of the substance derived from the toner 90 on the regulating blade 42 can be suppressed. Accordingly, according to this embodiment, it is possible to suppress an image defect due to the regulating blade 42.

Next, another embodiment (embodiment 2) of the present invention will be described. Basic constitution and operation of an image forming apparatus of this embodiment are the same as those of the image forming apparatus of the embodiment 1. Accordingly, in the image forming apparatus of this embodiment, elements having identical or corresponding functions or constitutions to those of the image forming apparatus of the embodiment 1 will be omitted from detailed description by adding the same reference numerals or symbols as those in the embodiment 1.

This embodiment is different from the embodiment 1 in that rotation of the developing roller 41 is made even in the development separation state after the developing rotation operation is performed in the development contact state in a predetermined case described in the following.

There is a case that during the non-image formation, the photosensitive drum 1 is rotated in the development separation state for an operation with a stop of the image forming operation during the image forming job and for the cleaning operation of the charging roller 2. A time for these operations can be effectively utilized for suppressing the development stripe.

Therefore, in this embodiment, the developing roller 41 is rotated during the rotation operation of the photosensitive drum 1 in the development contact state performed, immediately after the developing rotation operation is performed in the development contact state, in the case where the image formation is not subsequently carried out continuously. That is, in this embodiment, in the above-described case, after the developing rotation operation in the development contact state is performed, the developing roller 41 is rotated in the development separation state before subsequent image formation is carried out (typically, the developing roller 41 is rotated in the development separation state continuously immediately before the developing rotation operation is performed) in the development contact state.

Thus, by rotating the developing roller 41 even in the development separation state, the opposite polarity substance stagnating in a large amount in the neighborhood of the regulating blade 42 with formation of the image with the high print ratio can be more effectively diffused inside the developing device 4. By this, the density of the opposite polarity substance to the toner 90 passing through between the regulating blade 42 and the developing roller 41 can be further decreased.

Further, in this embodiment, in the case where the rotation of the developing roller 41 in the development separation state is carried out, the controller 60 adds an addition developing rotation distance Dex calculated by a formula 4 below to the cumulative developing rotation distance D, and causes the storing portion 63 to store a resultant value. The addition developing rotation distance Dex is calculated by multiplying an added rotation distance E of the developing roller 41 in the development separation state by a first coefficient K1 as represented by the following formula 4.

$$Dex = E \times k1 \qquad \text{formula 4}$$

The first coefficient k1 can be acquired as a ratio of a suppressing effect of the development stripe by the rotation of the developing roller 41 in the development separation state to a suppressing effect of the development stripe by the rotation of the developing roller 41 in the development contact state. Incidentally, information of the first coefficient k1 is acquired in advance and is stored in the storing portion 63. In this embodiment, the first coefficient k1 is 0.35. Then, in discrimination of execution of a subsequent developing rotation operation and calculation of the rotation distance Dadd and the rotation time Tadd in the subsequent developing rotation operation, an increase in cumulative developing rotation distance D by an amount corresponding to the effect by the rotation of the developing roller 41 in the development separation state is taken into consideration.

By this, in this embodiment, the rotation time Tadd can be decreased when compared with the case where the rotation of the developing roller 41 in the development separation state after the developing rotation operation. Accordingly, the occurrence of the development stripe can be suppressed while making the waiting time of the user due to the developing rotation operation shorter.

Incidentally, in this embodiment, in the case where the developing rotation operation in the development contact state is discriminated as being unnecessary and is not performed, the rotation of the developing roller 41 in the development separation state is not carried out, but the present invention is not limited thereto. For example, in the case where the photosensitive drum 1 is rotated in the development separation state, the developing roller 41 may also be always rotated. Or, in the case where the photosensitive drum 1 is rotated in the development separation state, the developing roller 41 may also be rotated at a predetermined timing (frequency). Further, as described above, rotation of the developing roller 41 by utilizing a period in which the photosensitive drum 1 is rotated in the development separation state is effective, but in the case where the developing roller 41 is rotated in the development separation state, the rotation of the photosensitive drum 1 may be stopped.

Thus, in this embodiment, after the developing rotation operation is performed in a state in which the developer carrying member 41 contacts the image bearing member 1 and before the developer image is subsequently formed on the image bearing member 1, the controller controls the driving portion 126 and the contact and separation mechanism 80 so as to rotate the developer carrying member 41 in a state in which the developer carrying member 41 is separated from the image bearing member 1.

As described above, in this embodiment, after the developing roller 41 and the photosensitive drum 1 are rotated, as the developing rotation operation, in the development contact state, rotation of the developing roller 41 and the photosensitive drum 1 is carried out in the development separation state. By this, in this embodiment, the rotation time Tadd can be decreased when compared with the embodiment 1, and therefore, the occurrence of the development stripe can be suppressed while making the waiting time of the user due to the developing rotation operation shorter.

Next, another embodiment (embodiment 3) of the present invention will be described. Basic constitution and operation of an image forming apparatus of this embodiment are the same as those of the image forming apparatus of the embodiment 1. Accordingly, in the image forming apparatus of this embodiment, elements having identical or corresponding functions or constitutions to those of the image forming apparatus of the embodiment 1 will be omitted from detailed description by adding the same reference numerals or symbols as those in the embodiment 1.

This embodiment is different from the embodiment 1 in that a relationship between the surface potential Vd3 of the photosensitive drum 1 and the developing bias Vdev during the developing rotation operation is set as described in the following.

An electrostatic force acting on the opposite polarity substance (positive-polarity substance) in a direction toward the photosensitive drum 1 becomes larger with a higher absolute value of the potential difference ΔVd3 (=(surface potential of photosensitive drum 1)−(surface potential of developing roller 41), formed between the photosensitive drum 1 and the developing roller 41 during the developing rotation operation, with the same polarity (negative polarity) as the normal charge polarity of the toner 90, so that the opposite polarity substance can be easily transferred onto the photosensitive drum 1. By this, even in the developing rotation operation in which the rotation distance and the rotation time are shorter, the density of the opposite polarity substance to the toner 90 is decreased, so that the occurrence of the development stripe can be suppressed.

Therefore, in this embodiment, the absolute value of the potential difference ΔVd3 (=Vd3−Vdev) between the surface potential Vd3 of the photosensitive drum 1 and the developing bias Vdev during the developing rotation operation is made larger than an absolute value of the potential difference ΔVd2 (=Vd2−Vdev) between the surface potential Vd2 of the photosensitive drum 1 and the developing bias Vdev during the image formation.

As a method of adjusting such potential differences between the photosensitive drum 1 and the developing roller 41, for example, the following methods exist. First, there is a method in which an absolute value of the negative surface potential of the photosensitive drum 1 is increased by adjusting (light) emission intensity of the exposure device 31 during the developing rotation operation to a side lower than emission intensity of the exposure device 31 for the background portion during the image formation. Further, there is a method in which the absolute value of the negative surface potential of the photosensitive drum 1 is increased by making an absolute value of the negative charging bias during the developing rotation operation higher than an absolute value of the negative charging bias during the image formation. Further, there is a method in which an absolute value of the negative developing bias Vdev during the developing rotation operation is made lower than an absolute value of the negative developing bias Vdev during the image formation.

In this embodiment, the developing bias Vdev during the developing rotation operation is −350 V which is the same as the developing bias Vdev during the image formation. Further, in this embodiment, the charging bias during the developing rotation operation is −1100 V which is the same as the charging bias during the image formation. Further, in this embodiment, during the developing rotation operation, the exposure of the photosensitive drum 1 and the background exposure are not performed during the developing rotation operation. That is, in this embodiment, the surface potential Vd3 (in substantially entire area of the image forming region with respect to the rotational axis direction of the developing roller 41) of the photosensitive drum 1 during the developing rotation operation is −600 V which is the same as the surface potential Vd1 of the photosensitive drum 1 after the charging. That is, in this embodiment, the surface potential Vd3 of the photosensitive drum 1 during the developing rotation operation is −600 V which is larger in absolute value on the same polarity side than the surface potential Vd2 (−550 V) of the photosensitive drum 1 at the background portion during the image formation. By this, in this embodiment, the potential difference ΔVd3 (=Vd3−Vdev) between the surface potential Vd3 of the photosensitive drum 1 and the developing bias Vdev during the developing rotation operation is −250 V which is higher in absolute value than −200 V which is the density difference ΔVd2 (=Vd2−Vdev) between the surface potential Vd2 of the photosensitive drum 1 at the background portion and the developing bias Vdev during the image formation.

Further, in this embodiment, a calculating method of a rotation distance necessary in the developing rotation operation corresponding to the developing rotation operation in a condition of the above-described potential differences is changed as follows relative to the embodiment 1.

That is, in this embodiment, the controller 60 calculates a rotation distance Dadd2 in the developing rotation operation by a formula 5 below. As represented by the formula 5, the rotation distance Dadd2 in this embodiment is calculated by dividing the rotation distance Dadd in the embodiment 1, calculated by the above-described formula 3, by a second coefficient k2 in a manner such that a value corresponding to enhancement of the effect of the developing rotation operation is corrected by the change in condition of the print differences.

$$Dadd2 = Dadd / k2 \quad \text{formula 5}$$

The second coefficient k2 can be acquired as a ratio of a suppressing effect of the development stripe by the condition of the potential difference between the photosensitive drum 1 and the developing roller 41 in the embodiment 1 to a suppressing effect of the development stripe by the condition of the potential difference between the photosensitive drum 1 and the developing roller 41 in this embodiment. Incidentally, information of the second coefficient k2 is acquired in advance and is stored in the storing portion 63. In this embodiment, the second coefficient k2 is 1.05. The rotation distance Dadd2 after the above-described correction becomes a value lower than the rotation distance Dadd before the correction. Incidentally, in this embodiment, the rotation distance Dadd2 was acquired on the basis of the ratio between the development stripe suppressing effects as described above, but for example, the rotation distance Dadd2 may also be acquired by using a difference in development stripe suppressing effect, and the influence by the change in potential difference condition may only be required to be capable of being taken into consideration.

Further, in this embodiment, a rotation time Tadd2 in the developing rotation operation which is corrected in value corresponding to enhancement of the effect of the developing rotation operation is determined by dividing the above-described rotation distance Dadd2 in the developing rotation operation by the rotational speed of the developing roller 41. Further, in this embodiment, the controller 60 carries out control so as to perform the developing rotation operation for the corrected short rotation time Tadd2.

By this, in this embodiment, the necessary rotation time of the developing rotation operation can be decreased when compared with the case where the potential difference between the photosensitive drum 1 and the developing roller 41 device the developing rotation operation is the same as the potential difference between the photosensitive drum 1 and the developing roller 41 during the image formation. Accordingly, the occurrence of the development stripe can be suppressed while making the waiting time of the user due to the developing rotation operation shorter.

Further, in this embodiment, in order to enhance the effect of moving the opposite polarity substance toward the photosensitive drum 1, the case where the absolute value of the potential difference ΔVd3 (=Vd3−Vdev) between the surface potential Vd3 of the photosensitive drum 1 and the developing bias Vdev during the developing rotation operation is made higher than the absolute value of the potential difference ΔVd2 (=Vd2−Vdev) between the surface potential Vd2 of the photosensitive drum 1 at the background portion and the developing bias Vdev during the image formation was described. However, depending on a status of the formation of the image with the high print ratio during the image formation, the absolute value of the potential difference ΔVd3 (=Vd3−Vdev) during the developing rotation operation may be made higher or lower than the absolute value of the potential difference ΔVd2 (=Vd2−Vdev). For example, in the case where the maximum cumulative pixel number Pmax exceeds a predetermined value set in advance (in the case of a super-high print ratio), the absolute value of the potential difference ΔVd3 (=Vd3−Vdev) during the developing rotation operation can be set so as to be higher than the absolute value of the potential difference ΔVd2 (=Vd2−Vdev) during the image formation. This can be achieved by, for example, lowering a background exposure amount than the background exposure amount during the image formation or by non-execution of the background exposure. On the other hand, for example, in the case where the maximum cumulative pixel number Pmax is the above-described predetermined value or less, the absolute value of the above-described potential difference ΔVd3 (=Vd3−Vdev) during the developing rotation operation can be set to a value equal to or lower than the absolute value of the above-described potential difference ΔVd2 (=Vd2−Vdev) during the image formation. This can be achieved by, for example, making the background exposure amount higher than the background exposure amount during the image formation.

Thus, in this embodiment, the controller 60 controls the charging device 2 and the developing voltage applying portion 122 so as to perform the developing rotation operation in a state in which a potential difference such that the surface potential of the image bearing member 1 is higher than the potential of the developer carrying member 41 on the same polarity side as the normal charge polarity of the developer was formed, and sets the absolute value of the potential difference so as to be higher than the absolute value of the potential difference between the surface print of the non-image portion of the image bearing member 1 and the potential of the developer carrying member 41 during the image forming operation.

As described above, in this embodiment, the potential difference between the photosensitive drum 1 and the developing roller 41 during the developing rotation operation is made larger than the potential difference in the embodiment 1 on the same polarity side as the normal charge polarity of the toner 90. By this, in this embodiment, the necessary rotation time in the developing rotation operation can be decreased when compared with the embodiment 1, and therefore, the occurrence of the development stripe can be suppressed while making the waiting time of the user due to the developing rotation operation shorter. As described above, the present invention was described based on the specific embodiments, but is not limited thereto.

In the above-described embodiments, a monocolor image forming apparatus including a single developing device was illustrated as an example, but the present invention is also applicable to a full-color image forming apparatus including a plurality of developing devices. In that case, for each of the developing devices of colors, print amounts of the plurality of regions A1 to An counted in a predetermined period by the print amount counting means is detected and a developing rotation operation corresponding thereto may only be required to be executed.

Further, in the above-described embodiments, the image forming apparatus includes the contact and separation mechanism for moving the developer carrying member toward and away from the image bearing member, but the present invention is not limited thereto. The image forming apparatus may employ a constitution in which the contact and separation mechanism is not provided and in which the developer carrying member substantially always contacts the image bearing member in the apparatus main assembly.

According to the present invention, it is possible to suppress the image defect due to the regulating member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-002750 filed on Jan. 11, 2023, which is hereby incorporated by reference herein in its entirety.

What is claimed is:

1. An image forming apparatus comprising:

a rotatable image bearing member;

a charging member configured to electrically charge a surface of the image bearing member;

an exposure unit configured to expose a charged surface of the image bearing member to form an image portion on the image bearing member by an electrostatic latent image;

a developing unit including a rotatable developer carrying member configured to form a developer image on the image bearing member by supplying a developer to the image portion of the image bearing member and including a regulating member configured to regulate the developer carried on the developer carrying member;

a transfer member configured to transfer the developer image, formed on the image bearing member, onto a recording material;

a counting portion configured to acquire a count value obtained by integrating a value correlating with an area of the image portion with respect to a direction along a surface movement direction of the developer carrying member for each of a plurality of regions obtained by dividing a surface region of the image bearing member with respect to a direction substantially perpendicular to the surface movement direction of the developer carrying member;

a driving portion configured to drive the developer carrying member; and a controller capable of controlling the driving portion, wherein the controller carries out control so as to perform an image forming operation capable of forming the developer image, on the image bearing member, to be transferred onto the recording material and a non-image forming operation in which the developer image to be transferred onto the recording material is not formed on the image bearing member, and wherein depending on each of count values in the plurality of regions acquired by the counting portion in a predetermined period, the controller controls the driving portion so as to change a rotation amount of the developer carrying member in a developing rotation operation for rotating the developer carrying member during the non-image forming operation.

2. The image forming apparatus according to claim 1, wherein the controller sets the predetermined period on the basis of a rotation amount of the developer carrying member both during the image forming operation and during the non-image forming operation.

3. The image forming apparatus according to claim 2, wherein the controller sets the predetermined period on the basis of a cumulative rotation amount of the developer carrying member from an initial state of the developer in the developing unit.

4. The image forming apparatus according to claim 3, wherein in a case that the count value of at least one region of the count values in the plurality of regions acquired by the counting portion in the predetermined period exceeds a predetermined threshold, the controller controls the driving portion so as to perform the developing rotation operation in a rotation amount of the developer carrying member depending on the count value of the at least one region.

5. The image forming apparatus according to claim 4, wherein the controller sets the threshold to a first value in a case that the rotation amount of the developer carrying member in the predetermined period is a first rotation amount and sets the threshold to a second value smaller than the first value in a case that the rotation amount of the developer carrying member in the predetermined period is a second rotation amount smaller than the first rotation amount.

6. The image forming apparatus according to claim 4, wherein in a case that a maximum value of the count values of the plurality of regions acquired by the counting portion in the predetermined period exceeds the threshold, the controller performs the developing rotation operation in a rotation amount of the developer carrying member depending on the maximum value, wherein in a case that a difference between the threshold and the maximum value is a first difference, the controller sets the rotation amount of the developer carrying member in the developing rotation operation to a first amount, and wherein in a case that the difference between the threshold and the maximum value is a second difference larger than the first difference, the controller sets the rotation amount of the developer carrying member in the developing rotation operation to a second amount larger than the first amount.

7. The image forming apparatus according to claim 4, wherein the controller sets the rotation amount of the developer carrying member in the developing rotation operation so that a value obtained by dividing each of the count values in the plurality of regions acquired by the counting portion in the predetermined period by the rotation amount of the developer carrying member in the predetermined period and in the developing rotation operation is the threshold or less in all the plurality of regions.

8. The image forming apparatus according to claim 1, further comprising:

an image bearing member driving portion configured to drive the image bearing member; and a developing voltage applying portion configured to apply a voltage to the developer carrying member, wherein the controller controls the driving portion and the image bearing member driving portion so that the developing rotation operation is performed by rotating the developer carrying member and the image bearing member in a state in which the developer carrying member contacts the image bearing member and controls the charging member and the developing voltage applying portion so that the developing rotation operation is performed in a state in which a potential difference such that a surface potential of the image bearing member is larger than a potential of the developer carrying member on a side identical in polarity to a normal charge polarity of the developer is formed between the image bearing member and the developer carrying member.

9. The image forming apparatus according to claim 8, wherein the controller sets an absolute value of the potential difference so as to be larger than an absolute value of a potential difference between a surface potential of a non-image portion on the image bearing member and the potential of the developer carrying member during the image forming operation.

10. The image forming apparatus according to claim 1, further comprising:

an image bearing member driving portion configured to drive the image bearing member; and a contact and separation mechanism configured to bring the image bearing member into contact with and separation from the developer carrying member, wherein the controller controls the driving portion, the image bearing member driving portion, and the contact and separation mechanism so that the developing rotation operation is performed by rotating the developer carrying member and the image bearing member in a state in which the developer carrying member contacts the image bearing member.

11. The image forming apparatus according to claim 10, wherein after the developing rotation operation is performed in the state in which the developer carrying member contacts the image bearing member and before the developer image is formed on the image bearing member, the controller controls the driving portion and the contact and separation mechanism so as to rotate the developer carrying member in a state in which the developer carrying member separates from the image bearing member.

12. The image forming apparatus according to claim 1, further comprising:

a developing voltage applying portion configured to apply a voltage to the developer carrying member; and a regulating voltage applying portion configured to apply a voltage to the regulating member, wherein the controller controls the developing voltage applying portion and the regulating voltage applying portion so that a potential difference such that a potential of the regulating member is larger than a potential of the developer carrying member on a side identical in polarity to a normal charge polarity of the developer is formed between the regulating member and the developer carrying member during the image forming operation.

13. The image forming apparatus according to claim 1, wherein the developer contains toner particles and a coating material having a charge polarity opposite to a normal charge polarity of the toner particles.

14. An image forming apparatus comprising:

a rotatable image bearing member;

a charging member configured to electrically charge a surface of the image bearing member;

an exposure unit configured to expose a charged surface of the image bearing member to form an image portion on the image bearing member by an electrostatic latent image;

a developing unit including a rotatable developer carrying member configured to form a developer image on the image bearing member by supplying a developer to the image portion of the image bearing member and including a regulating member configured to regulate the developer carried on the developer carrying member; and a transfer member configured to transfer the developer image, formed on the image bearing member, onto a recording material, wherein when a maximum value of print ratios each obtained by integrating a value correlating with an area ratio of the image portion with respect to a direction along a surface movement direction of the developer carrying member for an associated one of a plurality of regions obtained by dividing a surface region of the image bearing member with respect to a direction substantially perpendicular to the surface movement direction of the developer carrying member is defined as a maximum print ratio, a mode in which an image forming job for continuously forming images, each of which maximum print ratio is a first value, on a plurality of recording materials in a number of sheets is performed once or more is defined as a first mode, and a mode in which an image forming job for continuously forming images, each of which maximum print ratio is a second value larger than the first value, on recording materials in a same number of sheets as the number of sheets in the first mode is performed in a same number of times as a number of times in the first mode is defined as a second mode, an integrated value of a rotation amount of the developer carrying member both during an image forming operation capable of forming the developer image, on the image bearing member, to be transferred onto the recording material and during a non-image forming operation in which the developer image to be transferred onto the recording material is not formed on the recording material is larger in the second mode than in the first mode.

15. The image forming apparatus according to claim 14, wherein when a mode in which the images are formed on the recording materials in the first mode and the second mode and in which an operation in the second mode is performed after an operation in the first mode is defined as a third mode, and a mode in which the images are formed on the recording materials in the first mode and the second mode and in which the operation in the first mode is performed after the operation in the second mode is defined as a fourth mode, the integrated value of the rotation amount of the developer carrying member both during the image forming operation and during the non-image forming operation is larger in the fourth mode than in the third mode.

16. An image forming apparatus comprising:

a rotatable image bearing member;

a charging unit configured to electrically charge a surface of the image bearing member;

an exposure unit configured to expose a charged surface of the image bearing member to form an image portion on the image bearing member by an electrostatic latent image;

a developing unit including a rotatable developer carrying member configured to form a developer image on the image bearing member by supplying a developer to the image portion of the image bearing member and including a regulating member configured to regulate the developer carried on the developer carrying member; and a transfer member configured to transfer the developer image, formed on the image bearing member, onto a recording material, wherein when a maximum value of print ratios each obtained by integrating a value correlating with an area of the image portion with respect to a direction along a surface movement direction of the developer carrying member for an associated one of a plurality of regions obtained by dividing a surface region of the image bearing member with respect to a direction substantially perpendicular to the surface movement direction of the developer carrying member is defined as a maximum print ratio, a mode in which an image forming job for continuously forming an image, of which maximum print ratio is a predetermined value, on recording materials in a number of sheets of one or more is intermittently performed a plurality of times is defined as a fifth mode, a mode in which an image forming job for continuously forming images, each of which maximum print ratio is the predetermined value, on recording materials in a number of sheets larger than the number of sheets in the fifth mode is intermittently performed in a number of times smaller than a number of times in the fifth mode is defined as a sixth mode, a mode in which the images are formed on the recording materials in the fifth mode and the sixth mode and in which an operation in the sixth mode is performed after an operation in the fifth mode is defined as a seventh mode, and a mode in which the images are formed on the recording materials in the fifth mode and the sixth mode and in which the operation in the fifth mode is performed after the operation in the sixth mode is defined as an eighth mode, an integrated value of a rotation amount of the developer carrying member both during an image forming operation capable of forming the developer image, on the image bearing member, to be transferred onto the recording material and during a non-image forming operation in which the developer image to be transferred onto the recording material is not formed on the recording material is larger in the eighth mode than in the seventh mode.

* * * * *